US008791984B2

(12) United States Patent
Jones et al.

(10) Patent No.: US 8,791,984 B2
(45) Date of Patent: Jul. 29, 2014

(54) DIGITAL SECURITY CAMERA

(75) Inventors: Peter W. J. Jones, Belmont, MA (US); Ellen Cargill, Norfolk, MA (US); Dennis W. Purcell, Medford, MA (US)

(73) Assignee: Scallop Imaging, LLC, Boston, MA (US)

( * ) Notice: Subject to any disclaimer, the term of this patent is extended or adjusted under 35 U.S.C. 154(b) by 523 days.

(21) Appl. No.: 13/030,960

(22) Filed: Feb. 18, 2011

(65) Prior Publication Data

US 2011/0234807 A1 Sep. 29, 2011

Related U.S. Application Data

(63) Continuation-in-part of application No. 12/384,209, filed on Mar. 31, 2009, now abandoned, which is a continuation-in-part of application No. 12/313,274, filed on Nov. 17, 2008, now Pat. No. 8,564,640.

(60) Provisional application No. 61/305,847, filed on Feb. 18, 2010, provisional application No. 61/072,673, filed on Mar. 31, 2008, provisional application No. 61/137,002, filed on Jul. 25, 2008, provisional application No. 61/003,350, filed on Nov. 16, 2007.

(51) Int. Cl.
*H04N 7/00* (2011.01)

(52) U.S. Cl.
USPC ............................................................ 348/36

(58) Field of Classification Search
USPC ............................................................ 348/36
See application file for complete search history.

(56) References Cited

U.S. PATENT DOCUMENTS

| 3,863,207 | A | 1/1975 | Galella |
| 4,081,812 | A | 3/1978 | Flother |
| 4,229,094 | A | 10/1980 | Baab et al. |

(Continued)

FOREIGN PATENT DOCUMENTS

| DE | 3436886 A1 | 4/1986 |
| EP | 1341383 | 9/2003 |

(Continued)

OTHER PUBLICATIONS

International Search Report and Written Opinion for PCT/US 09/01999 dated Mar. 20, 2012.

(Continued)

*Primary Examiner* — Douglas Blair
(74) *Attorney, Agent, or Firm* — Schmeiser, Olsen & Watts LLP

(57) ABSTRACT

The systems and methods described herein provide imaging systems for imaging a scene. The imaging system includes an optical head, a processor, and an analog communication port. The processor receives captured digital image data from the optical head. The processor sends the image data to the analog communication port to generate an analog video stream that is protocol compatible with typical closed-circuit television (CCTV) networks, such as PAL or NTSC. The imaging system has a physical interface that allows the system to plug into a conventional CCTV network. To generate a video stream that is protocol compatible with the CCTV network, the analog communication port may down sample the digital image data to generate a PAL or NTSC compatible image. The down sampled digital image data is converted to a compliant analog signal and delivered over the physical layer of the CCTV network for display on a conventional television monitor.

20 Claims, 17 Drawing Sheets

(56) References Cited

U.S. PATENT DOCUMENTS

| | | | |
|---|---|---|---|
| 4,253,083 A | 2/1981 | Imamura | |
| 4,534,650 A | 8/1985 | Clerget et al. | |
| 4,628,466 A | 12/1986 | Tymes | |
| 5,103,306 A | 4/1992 | Weiman et al. | |
| 5,142,357 A | 8/1992 | Lipton et al. | |
| 5,194,988 A | 3/1993 | Flother | |
| 5,426,392 A | 6/1995 | Kornfeld | |
| 5,432,871 A | 7/1995 | Novik | |
| 5,495,576 A | 2/1996 | Ritchey | |
| 5,581,399 A * | 12/1996 | Abe | 359/410 |
| 5,657,073 A | 8/1997 | Henley et al. | |
| 5,668,593 A | 9/1997 | Lareau et al. | |
| 5,701,205 A | 12/1997 | Hasushita et al. | |
| 5,710,560 A | 1/1998 | Cohn | |
| 5,760,826 A | 6/1998 | Nayar | |
| 5,777,675 A | 7/1998 | Miida et al. | |
| 5,790,181 A | 8/1998 | Chahi et al. | |
| 5,961,571 A | 10/1999 | Gorr et al. | |
| 6,018,349 A | 1/2000 | Szeliski et al. | |
| 6,127,943 A | 10/2000 | Tauchi et al. | |
| 6,144,406 A | 11/2000 | Girard et al. | |
| 6,154,255 A | 11/2000 | Shishido et al. | |
| 6,210,006 B1 | 4/2001 | Menozzi et al. | |
| 6,282,330 B1 | 8/2001 | Yokota et al. | |
| 6,318,912 B1 | 11/2001 | Shono et al. | |
| 6,545,702 B1 | 4/2003 | Konolige et al. | |
| 6,591,008 B1 | 7/2003 | Surve et al. | |
| 6,611,241 B1 | 8/2003 | Firester et al. | |
| 6,650,772 B1 | 11/2003 | Inoue et al. | |
| 6,679,615 B2 | 1/2004 | Spearing | |
| 6,707,393 B1 | 3/2004 | Moore | |
| 6,778,207 B1 | 8/2004 | Lee et al. | |
| 6,781,618 B2 | 8/2004 | Beardsley | |
| 6,836,287 B1 | 12/2004 | Nakahara | |
| 6,851,809 B1 | 2/2005 | Sachtler et al. | |
| 6,895,256 B2 | 5/2005 | Harma et al. | |
| 6,977,685 B1 | 12/2005 | Acosta-Serafini et al. | |
| 7,015,954 B1 * | 3/2006 | Foote et al. | 348/218.1 |
| 7,072,107 B2 | 7/2006 | Filipovich et al. | |
| 7,084,904 B2 | 8/2006 | Liu et al. | |
| 7,084,905 B1 | 8/2006 | Nayar et al. | |
| 7,106,374 B1 | 9/2006 | Bandera et al. | |
| 7,123,292 B1 | 10/2006 | Seeger et al. | |
| 7,129,981 B2 | 10/2006 | Berstis | |
| 7,135,672 B2 | 11/2006 | Land | |
| 7,146,032 B2 | 12/2006 | Jung et al. | |
| 7,268,803 B1 | 9/2007 | Murata et al. | |
| 7,277,118 B2 | 10/2007 | Foote | |
| 7,335,868 B2 | 2/2008 | Liao et al. | |
| 7,385,626 B2 | 6/2008 | Aggarwal et al. | |
| 7,450,165 B2 * | 11/2008 | Ahiska | 348/240.2 |
| 7,529,424 B2 | 5/2009 | Ahiska | |
| 7,688,374 B2 | 3/2010 | Land | |
| 7,747,068 B1 | 6/2010 | Smyth et al. | |
| 7,839,926 B1 * | 11/2010 | Metzger et al. | 375/240.01 |
| 7,940,311 B2 | 5/2011 | Trimeche et al. | |
| 8,068,154 B2 | 11/2011 | Jacob et al. | |
| 8,471,918 B2 * | 6/2013 | Imada | 348/218.1 |
| 8,482,600 B2 * | 7/2013 | Lee | 348/47 |
| 2001/0019363 A1 | 9/2001 | Katta et al. | |
| 2002/0003573 A1 | 1/2002 | Yamaguchi et al. | |
| 2002/0122113 A1 * | 9/2002 | Foote | 348/48 |
| 2002/0126914 A1 | 9/2002 | Kotake et al. | |
| 2002/0141614 A1 | 10/2002 | Lin | |
| 2003/0071891 A1 | 4/2003 | Geng | |
| 2003/0151689 A1 | 8/2003 | Murphy | |
| 2004/0027451 A1 | 2/2004 | Baker | |
| 2004/0086186 A1 | 5/2004 | Kyusojin et al. | |
| 2004/0130620 A1 * | 7/2004 | Buehler et al. | 348/143 |
| 2004/0150641 A1 | 8/2004 | Duiker | |
| 2004/0196379 A1 | 10/2004 | Chen et al. | |
| 2004/0212677 A1 | 10/2004 | Uebbing | |
| 2004/0247173 A1 | 12/2004 | Nielsen et al. | |
| 2005/0036067 A1 | 2/2005 | Ryal et al. | |
| 2005/0141607 A1 | 6/2005 | Kaplinsky | |
| 2005/0206873 A1 | 9/2005 | Tanaka et al. | |
| 2005/0265582 A1 * | 12/2005 | Buehler et al. | 382/103 |
| 2006/0017807 A1 | 1/2006 | Lee et al. | |
| 2006/0031917 A1 | 2/2006 | Winder et al. | |
| 2006/0125921 A1 | 6/2006 | Foote | |
| 2006/0170614 A1 | 8/2006 | Tzong et al. | |
| 2006/0187305 A1 | 8/2006 | Trivedi et al. | |
| 2006/0204037 A1 | 9/2006 | Watanabe et al. | |
| 2006/0250505 A1 | 11/2006 | Gennetten et al. | |
| 2006/0275025 A1 | 12/2006 | Labaziewicz et al. | |
| 2007/0081091 A1 | 4/2007 | Pan et al. | |
| 2007/0097206 A1 | 5/2007 | Houvener et al. | |
| 2007/0159535 A1 | 7/2007 | Kumagai et al. | |
| 2007/0223904 A1 | 9/2007 | Bloom et al. | |
| 2007/0285547 A1 * | 12/2007 | Milligan et al. | 348/308 |
| 2009/0015674 A1 * | 1/2009 | Alley et al. | 348/144 |
| 2009/0091645 A1 | 4/2009 | Trimeche et al. | |
| 2009/0118600 A1 * | 5/2009 | Ortiz et al. | 600/306 |
| 2009/0141043 A1 | 6/2009 | Guo et al. | |
| 2009/0147071 A1 * | 6/2009 | Jones et al. | 348/36 |
| 2011/0069148 A1 * | 3/2011 | Jones et al. | 348/36 |
| 2011/0292287 A1 * | 12/2011 | Washington | 348/571 |
| 2012/0229596 A1 | 9/2012 | Rose et al. | |
| 2013/0010144 A1 * | 1/2013 | Park | 348/218.1 |
| 2013/0050553 A1 | 2/2013 | Bugnet et al. | |

FOREIGN PATENT DOCUMENTS

| | | |
|---|---|---|
| EP | 1363255 A2 | 11/2003 |
| JP | 2001/014591 | 1/2001 |
| JP | 2001094857 A | 4/2001 |
| JP | 2001320616 A | 11/2001 |
| JP | 2003141562 A | 5/2003 |
| JP | 2004072694 A | 3/2004 |
| JP | 2004328736 A | 11/2004 |
| JP | 2005051318 A | 2/2005 |
| JP | 2006173988 | 6/2006 |
| WO | WO-00/70486 | 11/2000 |
| WO | WO-02/065762 | 8/2002 |

OTHER PUBLICATIONS

International Search Report for PCT/US 08/12886 dated Feb. 12, 2009.

Nicolescu et al., "GlobeAll: Panoramic Video for an Intelligent Room", Integrated Media Systems Center, University of Southern California, Los Angeles, CA.

Niefeld, M. et al., "Projects—Camera Array Demonstrator", Distant Focus Corporation, http://wvvw.distantfocus.com/projects/icis/.

Extended European Search Report for European Application No. EP 08 84 8695 mailed Jan. 21, 2011.

International Search Report and Written Opinion for PCT/US 2011/025480 dated Aug. 29, 2012.

Mann et al., "Virtual bellows: constructing high quality stills from video," Proceedings of the International Conference on Image Processing, 1(13):363-367 (1994).

* cited by examiner

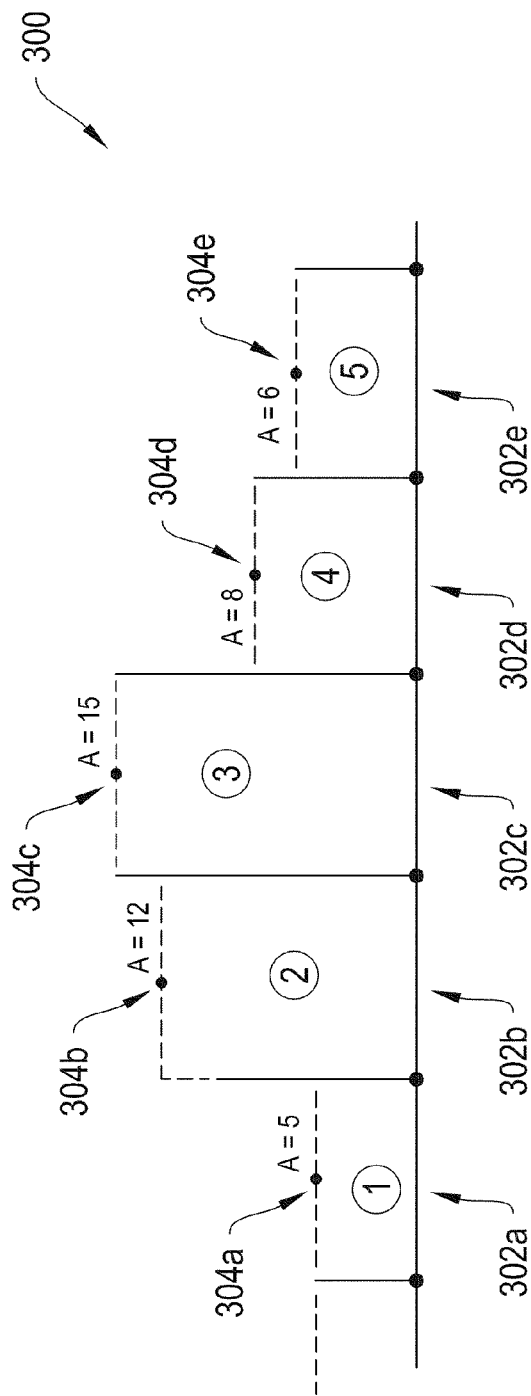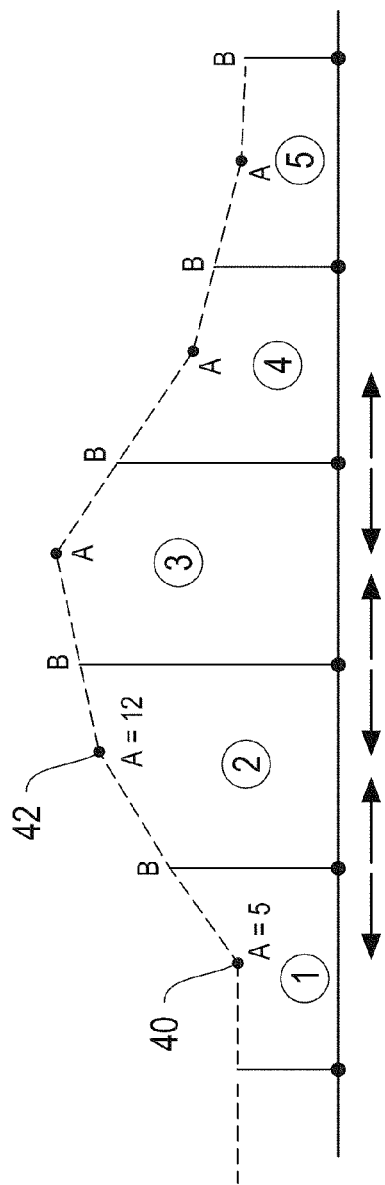

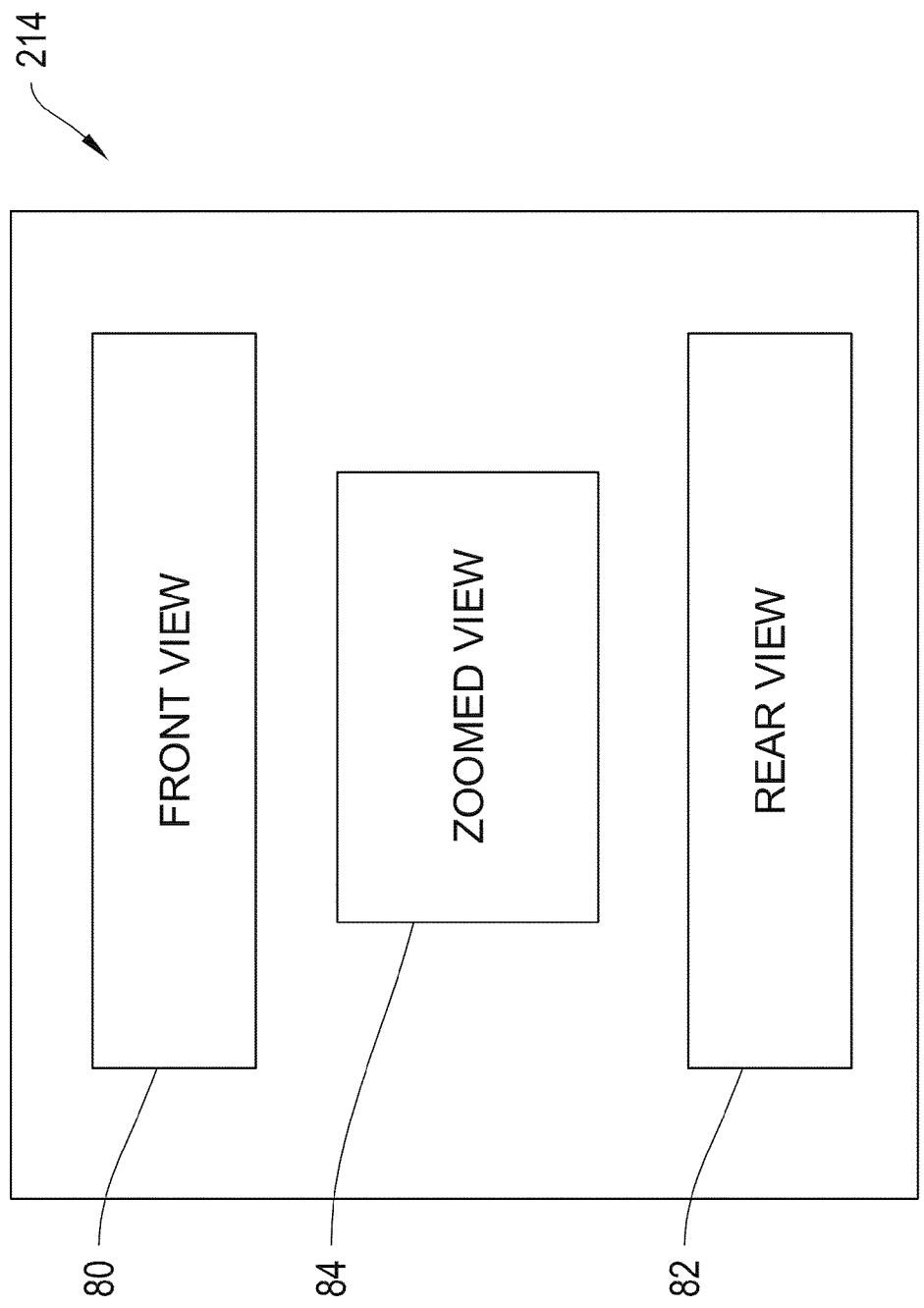

800
807

801a
801b
801c
801d
801e 801a
801b
801c
801d
801e

DIGITAL SECURITY CAMERA

CROSS-REFERENCE TO RELATED APPLICATIONS

This application claims the benefit of U.S. Provisional Application Ser. No. 61/305,847 filed on Feb. 18, 2010, and is a continuation-in-part of U.S. application Ser. No. 12/384,209 filed on Mar. 31, 2009, which claims the benefit of U.S. Provisional Application Ser. No. 61/072,673 filed on Mar. 31, 2008 and U.S. Provisional Application Ser. No. 61/137,002 filed on Jul. 25, 2008, and which is a continuation-in-part of U.S. application Ser. No. 12/313,274 filed on Nov. 17, 2008, which claims the benefit of U.S. Provisional Application Ser. No. 61/003,350 filed on Nov. 16, 2007. The teachings of the foregoing applications are hereby incorporated by reference herein in their entirety.

BACKGROUND

Today, there is a great need for video security systems. Video security systems reduce and deter crime, increase public safety and aid police investigations. Given these benefits, video security systems are used widely. In a typical set up, video cameras are located around an area, such as at each corner of a room in a museum. The cameras connect into a closed circuit television network that transmits the captured image data to television monitors at a security station. At the station, an operator monitors the different scenes and watches for inappropriate activity. Often the operator can direct the cameras to scan across the area or to zoom in on a specific area of the scene. Even more helpful are security systems capable of providing 180- or 360 degree situational awareness through a panoramic (i.e., large-angle) view of a scene. Situational awareness involves perceiving critical factors in the environment or scene. A video security system capable of providing situational awareness may be used in battlefield settings, areas of high crime, or in other locations where surveillance is useful.

One particularly effective camera for use in security systems is the camera described in US patent application 2009-0147071A1. That application discloses a multi element video camera that can capture a wide field of view as well as zoom into sections of the scene. Another digital security camera is the WV-NM100 manufactured and sold by the Panasonic Digital Communications & Security Company, a division of Matsushita Electric. This digital camera provides a pan-tilt-zoom digital camera that connects into a local area network to deliver a digital video stream to a computer display.

As digital cameras enter the market, more are replacing conventional analog cameras, with digital cameras. Although these systems can work well, there remains a need for digital camera systems that provide digital technologies that increase and improve security, rather than just replace existing analog technologies.

SUMMARY

The systems and methods described herein include digital camera security systems that provide multiple, independent image windows with a single camera. These systems employ digital technology to improve and increase performance of video security, rather than to just replace it. To this end, the systems in one embodiment have a high-pixel count image sensor that captures a high number of pixels of image data of a particular scene. In one particular embodiment, the high-pixel count image sensor captures 6.5 Mega pixel elements.

The "high-count" pixel sensor essentially blankets the surveillance scene with "pixels" by taking a very high resolution digital image of the scene. The high-pixel count image sensor captures the image data and stores the image data in an image memory within the digital camera. A processor down samples the stored image data and stores the down sampled data in a video frame memory to create a panoramic view of the scene and, thereby, provides a viewer with scene-wide situational awareness. The down sampling is selected to meet the video capability of the display, which may be a digital monitor or an analog video monitor. The processor further processes the raw image data by capturing a subset of the stored image data where that subset represents a particular section of the scene. The processor selects the section, typically, in response to user commands that direct the process to enlarge a particular section of the scene. The processor uses a reduced level of down sampling, up to no down sampling, to generate a second image window within the video frame memory. Optionally, other additional image windows may be similarly generated within the video frame memory. Both image windows are generated from the same raw image data in the image frame memory and therefore are synchronized images, leading to synchronized video streams. The plural images are composited together to create a single digital image frame that contains multiple views of the scene.

In certain applications where high resolution images are not required, the system described above may be adapted to utilize low-pixel count image sensors. For example, a low-pixel count image sensor may provide images at one quarter the resolution of a standard NTSC format image, i.e., 320×240. Similar to the process described above, the low-pixel count image sensors capture the image data and store the image data in an image memory within the digital camera. However, unlike high resolution images, the processor need not down sample the low resolution images before storing in a video frame memory. The low resolution images may already meet the video capability of the display, which may be a digital monitor or an analog video monitor. The processor may composite together the low resolution images to create a single digital image frame that contains multiple views of the scene for display on a monitor.

The digital camera processes the video frame memory to create a video data stream that is compatible with the physical layer and protocol of the network coupled to the digital camera. In one embodiment, the systems and methods described herein provide digital camera security systems with cameras having multiple imaging sensors arranged in an optical head that create a seamless panoramic view by reducing parallax distortion and adaptively adjusting exposure levels of the recorded images. In particular, an optical head is described with a stacked configuration of CMOS imaging sensors. In this multi-sensor embodiment, each element is arranged on the optical head to capture an image of a certain field of view. By orienting the heads at different angles, multiple overlapping fields of view are captured such that a panoramic view of 180° or 360° is captured. Each element is a multi-mega pixel imaging element that captures a high resolution image of its field of view. In alternate embodiments, a single high-count pixel sensor is employed. In some embodiments, one or more of the imaging elements may be a low-pixel count sensor providing a low resolution image. In either case, the image data is stored in a data memory. An embedded micro process performs image processing on the separately captured image data to generate a single panoramic image of the scene.

In a further alternative embodiment, an optical head includes a planar configuration of CMOS imaging sensors. Each sensor is arranged adjacent to another sensor such that the optical axes of the sensors lie substantially in the same plane. The optical axis of each sensor may be at an angular offset from its adjacent sensor. For example, the sensors may be arranged in a semi-circular arrangement. Each sensor captures a certain field of view. In this multi-sensor embodiment, each sensor is arranged adjacent to another sensor such that they have overlapping fields of view. The multiple overlapping fields of view are captured to provide an image with a field of view substantially greater than the field of view of a single imaging sensor.

The processor uses the captured high resolution image data to generate an analog video stream that is protocol compatible with typical closed-circuit television network systems, such as PAL or NTSC systems. The digital camera has a physical interface that allows the camera to plug into a conventional closed circuit television networks. To generate a data stream that is protocol compatible with the closed-circuit television network, the embedded processor, which may be an FPGA chip, down samples the stored high resolution image data to generate an NTSC compatible image format of 640×480 pixels. The down sampled digital image data is converted to an NTSC compliant analog signal and delivered over the physical layer closed circuit network for display on a conventional television monitor.

Optionally, but preferably, the embedded process also creates a composite image for display on the security television monitor that includes the panoramic image as well as one or more close up images from the scene. The embedded processor generate this image by creating a composite digital image that includes the down sampled panoramic image and less down sampled image or sensor resolution of a portion of the panoramic scene. The resulting image includes the panoramic image and picture window that provides an enlarged view of a portion of the panoramic image.

In one aspect, the systems and methods described herein provide for a system for imaging a scene. The system includes an optical head, a processor and an analog communication port. The optical head includes digital imaging sensors for generating image data. A first imaging sensor having a first field of view is placed adjacent to a second imaging sensor having a second field of view. The first field of view of the first imaging sensor at least partially overlaps the second field of view of the second imaging sensor. The processor is connected to the optical head. The processor has circuitry for receiving digital image data from each digital imaging sensor. The analog communication port converts the received digital image data into an analog data stream suitable for delivery over an analog data path.

In some embodiments, the digital imaging sensors each have an image resolution ranging from about 0.075 Mega pixels to about 10 Mega pixels. In some embodiments, the digital imaging sensors each have an image resolution ranging from about 0.075 Mega pixels to about 2 Mega pixels. In some embodiments, one or more digital imaging sensors have an image resolution more than 10 Mega pixels. In some embodiments, one or more digital imaging sensors have an image resolution more than 2 Mega pixels. In some embodiments, one or more digital imaging sensors have an image resolution less than 0.075 Mega pixels. In some embodiments, one or more digital imaging sensors has an image resolution of about 0.075 Mega pixels, about 0.3 Mega pixels, about 1.3 Mega pixels, about 1.9 Mega pixels, about 3.2 Mega pixels, about 3.8 Mega pixels, about 4.9 Mega pixels, about 6.1 Mega pixels, about 7.1 Mega pixels, about 8 Mega pixels, about 10 Mega pixels, or about 12 Mega pixels. In some embodiments, the processor includes means for combining the image data from respective digital image sensors to generate a single image. In some embodiments, each digital imaging sensor captures an image of a respective field of view. In some embodiments, the processor includes means for combining the image data from respective digital image sensors to generate a combined image including combined respective fields of view. In some embodiments, the digital imaging sensors are arranged such that the respective fields of view cover substantially 180° field of view.

In some embodiments, the processor includes image processing means for selectively controlling the image resolution. In some embodiments, the image processing means includes a magnification window process for processing the combined image to include at least one image portion having increased resolution and a larger relative image size. In some embodiments, the image processing means further includes a window controller for controlling at least one of the format and placement of the magnified image portion. In some embodiments, the image processing means includes a user interface for controlling location of the magnified image portion. In some embodiments, the processor includes image processing means for performing motion tracking.

In some embodiments, the analog communication port includes a digital-to-analog converter (DAC) for generating an analog data stream that is compatible with one of the NTSC or PAL television signal formats. In some embodiments, the analog communication port includes a connector selected from the group consisting of VGA, RCA, APC-7, BNC, C, F, N, QMA, SMA, SMB, SMC, TNC, or UHF connectors for coupling to the physical layer of a CCTV network.

In some embodiments, the analog communication port includes means for receiving and decoding Pan-Tilt-Zoom (PTZ) encoded command signals. The PTZ encoded command signals may be encoded in one of RS-232, RS-422, and RS-485 serial standards. In some embodiments, the analog communication port includes means for decoding the PTZ encoded command signals for the purpose of controlling image processing of the digital image data. In some embodiments, the analog communication port is included in a Field-Programmable Gate Array (FPGA).

In another aspect, the systems and methods described herein include a method for imaging a scene. An optical head is provided. The optical head includes digital imaging sensors for generating image data. A first imaging sensor having a first field of view is placed adjacent to a second imaging sensor having a second field of view. The first field of view of the first imaging sensor at least partially overlaps the second field of view of the second imaging sensor. Digital image data from each digital imaging sensor is received. The digital image data is converted into an analog data stream suitable for delivery over an analog data path.

In some embodiments, each digital imaging sensor captures an image of a respective field of view, the image data from respective digital image sensors are combined to generate a combined image including combined respective fields of view. In some embodiments, the combined image is processed to include at least one image portion having increased resolution and a larger relative image size. In some embodiments, Pan-Tilt-Zoom (PTZ) encoded command signals for controlling the pan, tilt, and zoom of an analog security camera are received and decoded. In some embodiments, the analog data stream is compatible with one of the NTSC or PAL television signal formats.

In yet another aspect, the systems and methods described herein include a system for imaging a scene. The system includes an optical head, a processor and an analog communication port. The optical head includes a digital imaging sensor for generating image data. The processor is connected to the optical head. The processor has circuitry for receiving digital image data from each digital imaging sensor. The analog communication port converts the received digital image data into an analog data stream suitable for delivery over an analog data path. In some embodiments, the processor includes image processing means for performing motion tracking. In some embodiments, the analog communication port includes a digital-to-analog converter (DAC) for generating an analog data stream that is compatible with one of the NTSC or PAL television signal formats.

In some embodiments, the digital imaging sensor has an image resolution ranging from about 0.075 Mega pixels to about 10 Mega pixels. In some embodiments, the digital imaging sensor has an image resolution ranging from about 0.075 Mega pixels to about 2 Mega pixels. In some embodiments, the digital imaging sensor has an image resolution more than 10 Mega pixels. In some embodiments, the digital imaging sensor has an image resolution more than 2 Mega pixels. In some embodiments, the digital imaging sensor has an image resolution less than 0.075 Mega pixels.

BRIEF DESCRIPTION OF THE DRAWINGS

The systems and methods described herein provide imaging systems with high-pixel count imaging sensors arranged that create a seamless panoramic view. The foregoing and other objects and advantages of the systems and methods described herein will be appreciated more fully from the following further description thereof, with reference to the accompanying drawings wherein;

FIG. 3A depicts an a set of unaltered exposure values for multiple imaging sensors, according to an illustrative embodiment;

FIGS. 3B-3D depict various methods for adaptively altering the best exposure value of each image, according to an illustrative embodiment;

FIG. 4A-4C show various embodiments of a display, according to an illustrative embodiment;

DETAILED DESCRIPTION

Figure 1A:
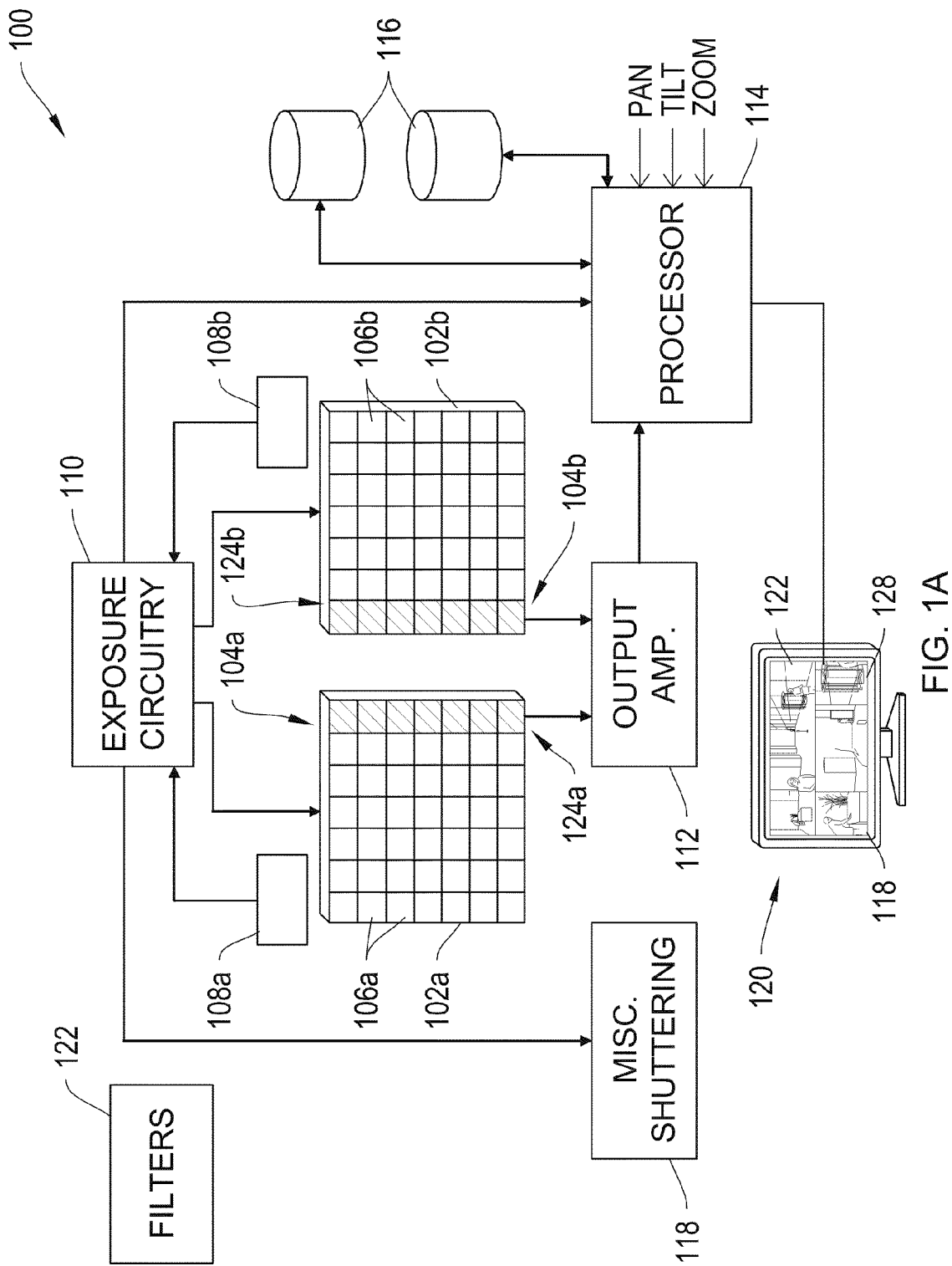
FIG. 1A depicts an imaging system having two imaging sensors, according to an illustrative embodiment.

The systems and methods described herein include, among other things, digital camera video security systems that allow a single camera to create and produce plural video images at a security station display. Optionally, a first window presents a panoramic view of a scene under surveillance. One or more additional windows are presented, each providing a video image with an enlarged view of an area within the panoramic view, although successively enlarged views of one particular area in the scene may also be provided. Further, a window providing information outside of the scene may optionally be provided.

As described below, the camera has a high count pixel sensor, either a single sensor, or multiple sensors arranged to capture a scene. In one embodiment, the camera uses five sensors, each of which has 1.3 Mega pixels, giving the camera 6.5 Mega pixels. With either embodiment, the scene is captured through a high number of image sensors. The camera operates at a frame rate of 15 images per second, such that the 6.5 Mega pixels of image data are dumped into an image memory on board the camera every ¹/₁₅th of a second.

The image memory holds the raw image data. A processor processes the data in the image memory to create multiple video images that the processor then combines into a single video stream for transport over the physical layer of the video network. The video stream appears on a video monitor with each video presented simultaneously on the display. The result is a single security camera that generates multiple video windows, each video window being independently controllable for pan, tilt and zoom. The images are generated by a single video camera controller that drives all of the image sensors operating on a common image memory and therefore are synchronized, as opposed to separate images generated by separate cameras. Additionally, the video stream offers a window of the captured scene, and thereby provides situational awareness of the scene, while simultaneously providing enlarged views of particular sections of the scene.

Finally, the digital camera may have an analog back end that generates an analog video stream, typically one that is NTSC or PAL compliant. The analog back end may also provide an interface between the digital camera and an analog network, e.g., a standard analog closed-circuit television (CCTV) network. The analog back end may receive analog input from the CCTV network, such as pan-tilt-zoom requests, and convert the requests to digital signals for the digital camera. As such, the analog back end may allow a digital camera to be placed in an existing analog CCTV network, reducing costs for deployment of the digital camera in the field.

The systems and methods described herein may use any suitable very high resolution (typically, greater than 1M pixel) image sensor. A single sensor or multiple sensors may be used. In the embodiments described below, only for the purpose of providing an example and for clarity, the camera will be described with reference to a multi-element image sensor. Additionally, for purposes of example, this multi-element image sensor will also include certain optional features, including rolling shutters, parallax compensation, and exposure control. However, one skilled in the art will understand that these are alternative embodiments, and that other embodiments with different features, or with only some of the described features may also be used.

The front end of one useful camera is shown as by block diagram in FIG. 1. It has two imaging sensors arranged in an optical head. These optical heads may include rows of imaging sensors, with each imaging sensor's orientation chosen so that the optical head can achieve a panoramic field-of-view with minimal parallax distortion. FIG. 1 depicts a functional block diagram of the elements of this type of camera. FIG. 1 shows an imaging system 100 having two sensors 102a and 102b positioned adjacent to each other. The imaging sensors may be arranged vertically or horizontally with respect to one another.

In this embodiment, there are light meters 108a and 108b that are connected to the sensors 102a and 102b and determine incident light on the sensors. However, in other embodiments, the light sensors themselves are used to meter light levels. The light meters 108a and 108b and the sensors 102a and 102b are connected to exposure circuitry 110. The exposure control circuitry and algorithms measure and determines an exposure value for each of the sensors 102a and 102b. The exposure circuitry 110 determines the substantially optimal exposure value for a sensor for imaging a given scene. The exposure circuitry 110 connects to mechanical and electronic shuttering systems 118 for controlling the timing and intensity of incident light on the sensors 102a and 102b. The sensors 102a and 102b may be coupled with one or more filters 122. The filters 122 may preferentially amplify or suppress incoming electromagnetic radiation in a given frequency range, for example, infra-red light.

In some embodiments, light meters 108a and 108b are not used. In a particular example, exposure circuitry 110 is included in processor 114. Processor 114 receives an exposure value from sensors 102a and 102b. Given the current exposure values, a composite image that includes images from sensors 102a and 102b may receive uneven exposure across the composite image. Processor 114 calculates new exposure values for each sensor such that that even exposure is received across the composite image. Processor 114 determines the substantially optimal exposure value for each sensor, and assigns the determined exposure value to each sensor for imaging the given scene, without need for light meters 108a and 108b.

The sensor 102a includes an array of photosensitive elements (or pixels) 106a distributed in an array of rows and columns. The sensor 102a may be a charge-coupled device (CCD) imaging sensor, or a complimentary metal-oxide semiconductor (CMOS) imaging sensor. Typically, but not always, the sensor 102b is similar to the sensor 102a. The sensors 102a and 102b are angled depending on the desired extent of the field-of-view. The sensors may be color or monochromatic sensors.

The processor 114 creates a video stream that is delivered to the display 120. In the depicted embodiment, the created video stream includes multiple combined videos, a first video 122 that presents the full panoramic scene 122, and two small videos, 124 and 125, each of which presents an enlarged video of a particular section of the larger scene.

Figure 1B:
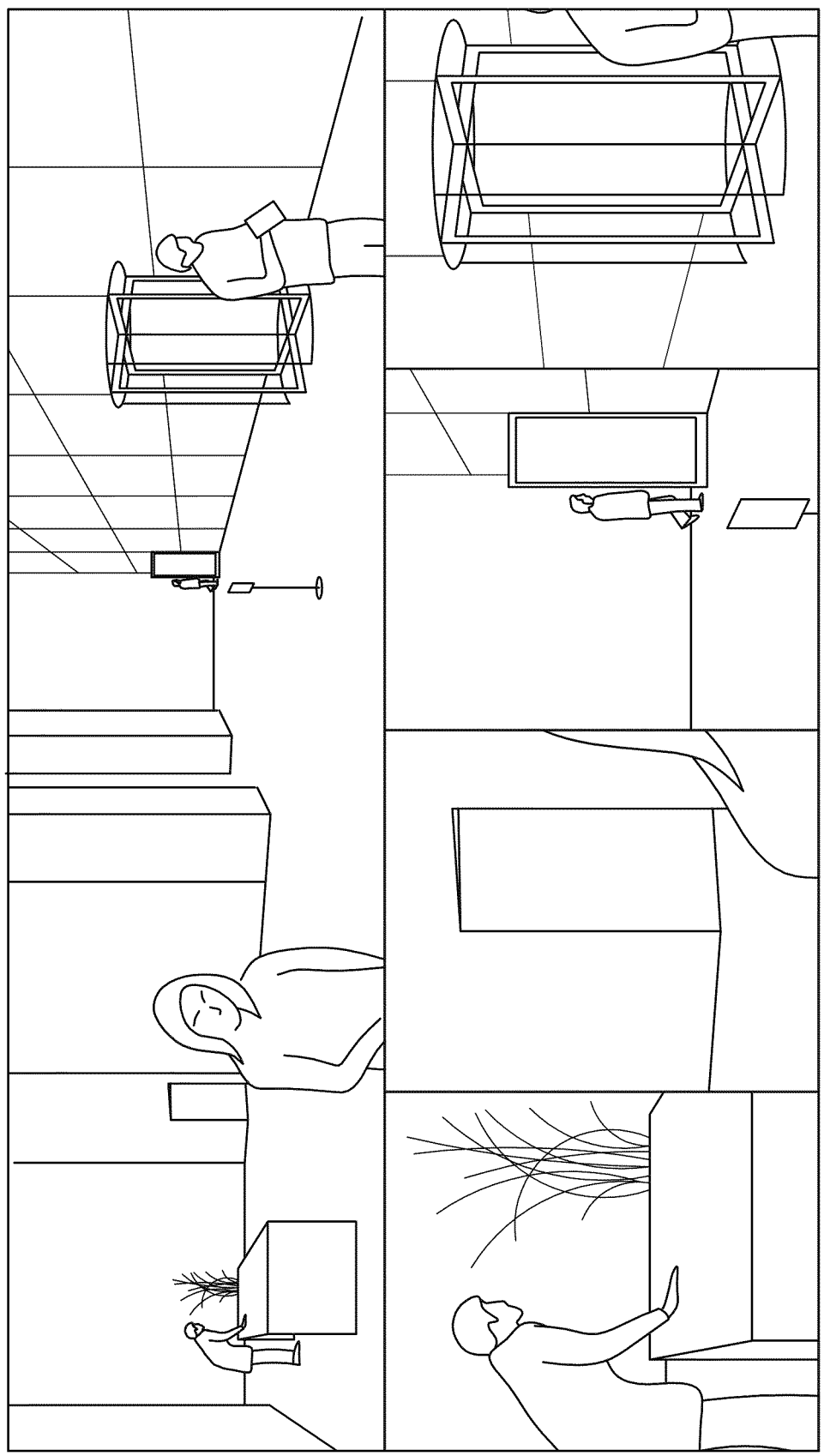
FIG. 1B depicts a display having the multiple video images generated by the camera of FIG. 1, according to an illustrative embodiment.

FIG. 1B depicts in more detail the type of video image being displayed on the monitor 120. FIG. 1B shows five independent videos being delivered through one video stream generated by the processor 114. The upper video provides at typically fifteen frames per second a situational awareness window of the full field of view of the digital camera. The four smaller videos each present an enlarged view of a particular part of the larger scene. Each video may be controlled independently at a security station, with the result being that the single digital video camera can replace five conventional pan-tilt-zoom (PTZ) cameras, while at the same time providing easier viewing for security personnel by placing all the images on a single display and with the situational awareness video providing context.

As discussed above, the digital camera takes 6.5 million spatially distinct data samples of the scene under surveillance and loads that raw image data into an image data memory in the processor 114. The processor, in one example, down samples four-by-four blocks of the raw image data to create a set of reduced resolution situational awareness data that is loaded into a video frame memory. The processor 114, optionally in response to commands delivered over the PTZ camera control path, selects portions of the raw data to place into the video frame memory at a lower level of down sampling, or with no down sampling at all. These sets of image data are also stored in the video frame memory, which is then processed and transmitted as a video stream.

In a conventional camera, a mechanical or electronic shutter may operate on the entire surface of an imaging sensor. The conventional shutter allows light to pass for a determined period of time, and then blocks light to the imaging sensor. Instead of closing a shutter over the entire imaging sensor, the shutter may be moved across the imaging sensor, a technique referred to as a rolling shutter. The term "rolling shutter" may also be used to refer to other processes which generally occur column-wise at each sensor, including charge transfer and exposure adjustment. CMOS sensors can include an electronic rolling shutter that moves vertically across the imaging sensor. In the systems and methods described herein, the rolling shutter may move horizontally across an imaging sensor. For example, the shutter may be horizontally moved across the imaging sensor to sequentially block light to columns of the imaging sensor. Once the shutter is moved into position, light is blocked at the column of the imaging sensor and the charge may then be transferred from the column and converted into an electrical signal. The shutter is then moved to the next column, and the charge from that column may be transferred and converted into an electrical signal. In this manner, charge may be transferred column-by-column over a period of time as the rolling shutter moves across the imaging sensor.

In an embodiment where two imaging sensors are provided, e.g., sensors 102a and 102b in FIG. 1A, control circuitry or a processor, e.g., processor 114, may coordinate the rolling shutters for the imaging sensors. The imaging sensors 102a and 102b are placed adjacent to one another as shown in FIG. 1A. The processor may instruct the rolling shutter of imaging sensor 102a to start from the left-most column of the imaging sensor. As the rolling shutter moves horizontally across the columns of imaging sensor 102a from left to right, the charge from each column may be transferred and converted into an electrical signal. Once the rolling shutter moves to the right-most column of imaging sensor 102a, the processor may instruct the rolling shutter to stop. The processor may instruct the rolling shutter of imaging sensor 102b to start moving from the left-most column of imaging sensor 102b. As the rolling shutter horizontally moves across the columns of imaging sensor 102b from left to right, the charge from each column may be transferred and converted into an electrical signal. Once the rolling shutter moves to the right-most column of imaging sensor 102b, the processor may instruct the rolling shutter to stop. The processor may now instruct the rolling shutter of 102a to start from the left-most column, and repeat the process described above. The processor may handle timing of the respective rolling shutters such that an uninterrupted image of the scene is captured.

The embodiment of a rolling shutter described above may advantageously increase the field of view of a scene by capturing images from multiple image sensors and compositing the images into a panoramic image. Additionally, the described rolling shutter may provide a panoramic image with fewer noticeable artifacts as compared to using a conventional rolling shutter. Since the direction of motion in a scene is generally horizontal, providing a rolling shutter that moves horizontally across the imaging sensor may minimally compress or expand portions of the image. Such artifacts may be visually less noticeable to a viewer.

In some embodiments, charge from each column is transferred along the column to an output amplifier 112. Charge may first be transferred from each pixel in the columns 104a and 104b. In certain embodiments, after this is completed, charges from columns 124a and 124b are first transferred to columns 104a and 104b, respectively, and then transferred along columns 104a and 104b to the output amplifier 112. Similarly, charges from each of the remaining columns are moved over by one column towards columns 104a and 104b and the transferred to output amplifier 112. The process may repeat until all or substantially all charges are transferred to the output amplifier 112.

In a further embodiment, the rolling shutter's column-wise transfer of charge is achieved by orienting a traditional imaging sensor vertically (i.e., nominally on its side). Additional embodiments of charge transfer methods will be discussed further below.

In a particular example, a rolling shutter is provided for an imaging sensor. As the rolling shutter is moved across the imaging sensor, it substantially covers a column of the imaging sensor array at a given time. The rolling shutter is moved to a column of the imaging sensor, light is blocked to the column, and charge is transferred from the column and converted into an electrical signal. The rolling shutter is then moved to the next column of the imaging sensor, and the charge transfer process is repeated. The charge is transferred column-by-column over a period of time. Such a rolling shutter allows the imaging sensor to capture, e.g., fast motion, with better sensitivity compared to a shutter that blocks light to the entire imaging sensor.

The depicted output amplifier 112 transfers charges and/or signals to the processor 114.

The processor 114 may include FPGAs, microcontrollers and microprocessors programmed to receive raw image data from the output amplifier 112 and exposure values from the exposure circuitry 110, and determine interpolated exposure values for each column in each of the sensors 102a and 102b. Interpolated exposure values are described in more detail with reference to FIGS. 3A-3D. In particular, processor 114 may include a central processing unit (CPU), a memory, and an interconnect bus. The memory may include an image memory that stores the raw image data for processing. An on board clock can direct the processor 114 to capture the image data from the sensors, such that the raw image data is captured fifteen times per second.

The optional mass storage 116 may by any suitable storage system such as magnetic disks or tape drives or optical disk drives, for storing data and instructions for use by the processor 114 and for storing.

The processor 114 may also include one or more input/output interfaces for data communications. The data interface may be a modem, a network card, serial port, bus adapter, or any other suitable data communications mechanism for communicating with one or more local or remote systems. The data interface may provide a relatively high-speed link to a network, such as the Internet. Alternatively, the processor 114 may include a mainframe or other type of host computer system capable of communications via the network.

The processor 114 may also include suitable input/output ports or use the interconnect bus for interconnection with other components, a local display 120, and keyboard or other local user interface for programming and/or data retrieval purposes (not shown).

In certain embodiments, the processor 114 includes circuitry for an analog-to-digital converter and/or a digital-to-analog converter. In such embodiments, the analog-to-digital converter circuitry converts analog signals received at the sensors to digital signals for further processing by the processor 114.

Figure 2:
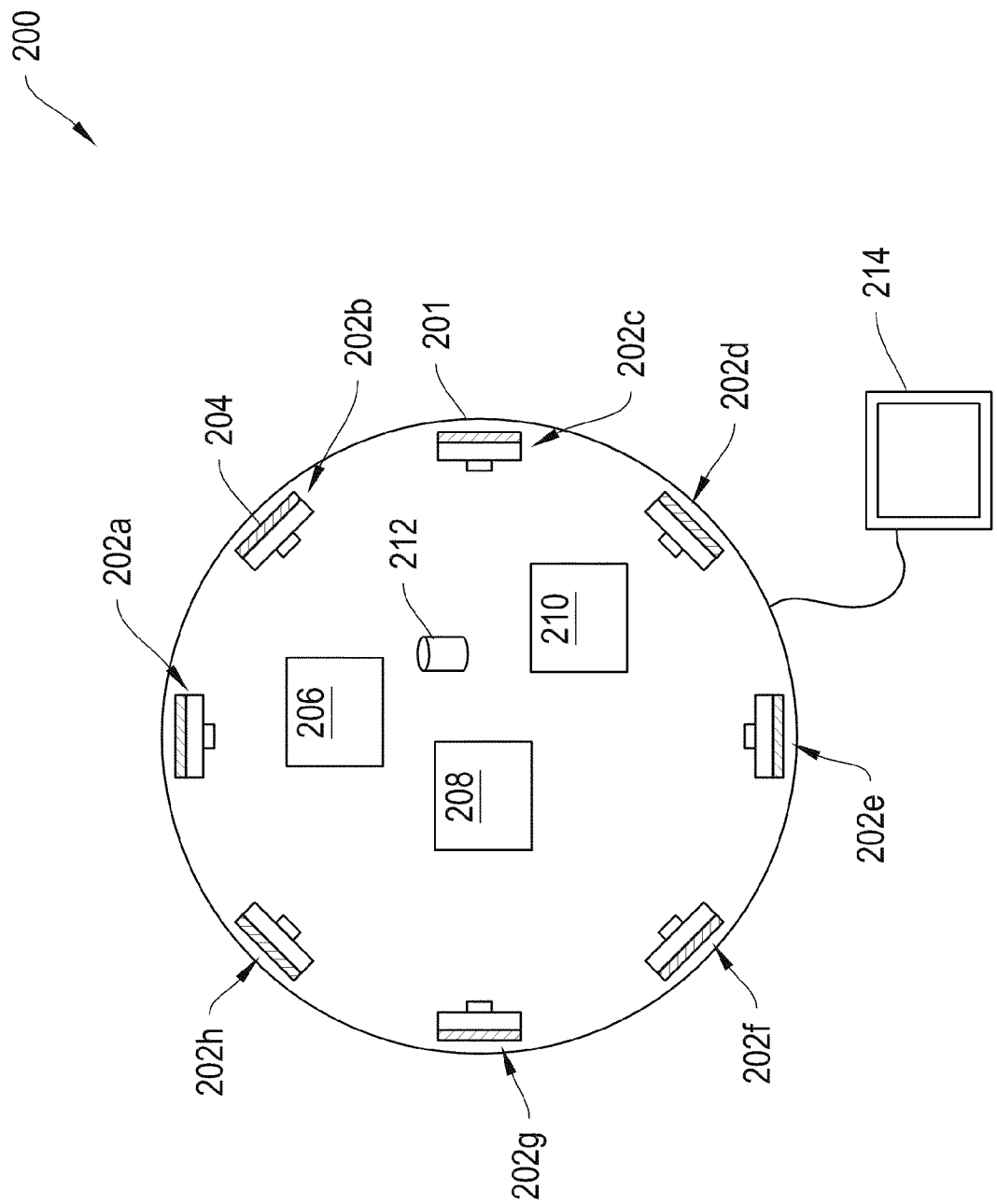
FIG. 2 depicts an imaging system for creating a seamless panoramic view having a plurality of imaging sensors in an optical head, according to an illustrative embodiment.

Although optional, it is helpful to have the digital security camera adjust the captured images so that a consistent exposure exists across the panoramic image. FIG. 2 depicts an imaging system 200 with multiple sensors mounted in an optical head in which each sensor is directed to capture a portion of a panoramic scene. Each imaging sensor is exposed to a different amount of light and has a different optimum exposure value that best captures the image, sometimes referred to as a best exposure value. An exposure circuitry 206, similar to exposure circuitry 110, determines and assigns the best exposure value for each sensor when the sensor is capturing an image. In some embodiments, the exposure circuitry 206 focuses on the center of a field-of-view captured by the respective sensor when determining the best exposure value for the respective sensor.

In some embodiments, exposure circuitry 206 is included in a processor, e.g., processor 114 described above. In a particular example, processor 114 receives an exposure value for each imaging sensor. Processor 114 determines the substantially optimal exposure value for each sensor, and assigns the determined exposure value to each sensor for imaging the given scene.

Sometimes, images recorded by the sensors, with each sensor being exposed to a different amount of light, are aligned next to each other in the final panoramic image. As a result, when unprocessed images from the multiple sensors are aligned, there exists a visible exposure-level discontinuity where the two images meet. To address this, the exposures of the images taken by the sensors may be adaptively adjusted to form a seamless panoramic view.

Figure 3C:
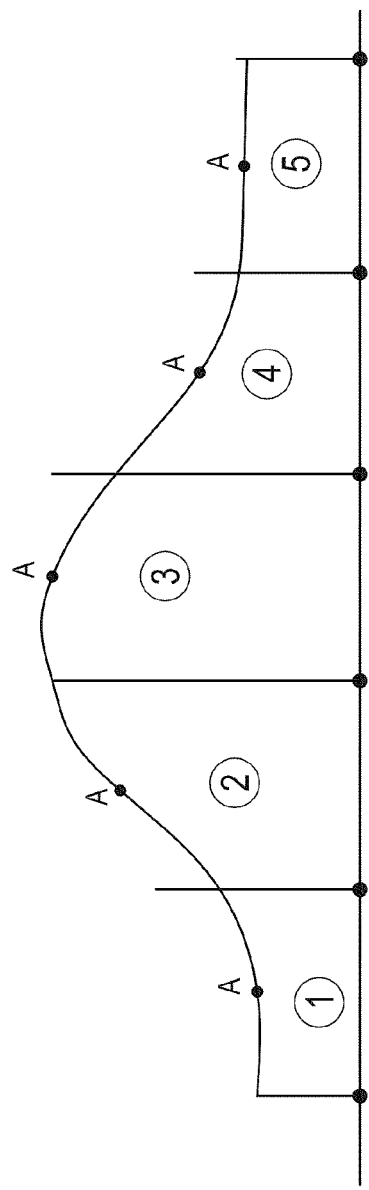
Figure 3D:
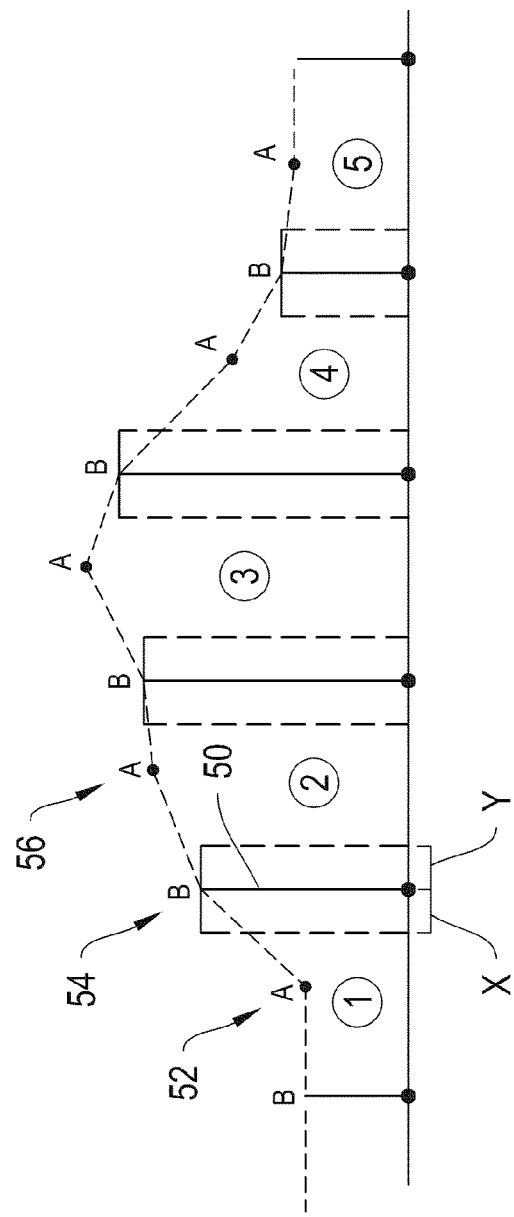

In particular, FIG. 2 depicts one embodiment of system 200 in which a plurality of sensors 202a-202h, similar to the sensors 102a and 102b of FIG. 1, are statically mounted in an optical head 201. Each of the sensors 202a-202h is directed to capture a portion of a scene. FIG. 2 also depicts exposure circuitry 206, a logic/processor 208, a memory 212, a multiplexer 210, and a display 214. Exposure circuitry 206, coupled to the sensors 202a-202h, adjusts the exposure for each sensor, resulting in each sensor recording an image at its best exposure. In some embodiments, the digital signals recorded by the sensors 202a-202h are sent to the multiplexer 210. The logic/processor 208 is in communication with the multiplexer 210. The logic/processor 208, upon receiving data signals from the sensors 202a-202h, accesses the received data signal and adjusts the exposure of each image recorded by the sensors. Digital signals representing a panoramic view may be stored in the memory 212 for further analysis (e.g. for higher-order pattern or facial recognition). After the exposure for each image is adjusted, a view having images joined in a sequential manner is formed and displayed on the display 214. Various methods for adjusting the best exposure values of the images are depicted in FIGS. 3B-3D.

The methods described herein are equally applicable to any of the optical head configurations described herein, including those embodiments illustrated by FIGS. 5-8C. In some embodiments, eight 1.3 Mega pixel sensors may be mounted in optical head 201 having a diameter of 3 inches. The diameter of optical head 201 may be larger or smaller depending on the application. In some embodiments, multiple imaging sensors are positioned in a closed circle having a combined field-of-view of about 360 degrees. In some embodiments, a plurality of imaging sensors may be positioned in a semi-circle having a combined field-of-view of about 180 degrees. Optical head 201 may be sized and shaped to receive a cover. The cover may have clear windows that are sized and positioned to allow the sensors to capture a panoramic image. Imaging system 200 may be connected to a display (e.g., a laptop monitor) through a USB interface.

As noted earlier, generally, when an image is projected to a capacitor array of a CMOS sensor, each capacitor accumulates an electric charge proportional to the light intensity at the location of its field-of-view. A control circuit then causes each capacitor to transfer its contents to the adjacent capacitor. The last capacitor in the array transfers its charge into an amplifier that converts the charge into a voltage. By repeating this process for each row of the array, the control circuit converts the entire contents of the array to a varying voltage and stores in a memory.

In some embodiments, the multiple sensors (e.g., sensors 202a-202h) record images as though they were one sensor. A first row of a capacitor array of a first sensor accumulates an electric charge proportional to its field-of-view and a control circuit transfers the contents of each capacitor array to its neighbor. The last capacitor in the array transfers its charge into an amplifier. Instead of moving to a second row of the array, in some embodiments, a micro-controller included in the system causes the first row of the capacitor array of the adjacent sensor (e.g., sensor 202d if the first sensor was sensor 202c) to accumulate an electric charge proportional to its field-of-view.

The logic/processor 208 may comprise any of the commercially available micro-controllers. The logic/processor 208 may execute programs for implementing the image processing functions and the calibration functions, as well as for controlling the individual system, such as image capture operations. Optionally, the micro-controllers can include signal processing functionality for performing the image processing, including image filtering, enhancement and for combining multiple fields-of-view.

FIG. 3A shows an example 300 of the best exposure values of five imaging sensors 302a-302e. FIG. 3A may also be illustrative of the best exposure values of the five imaging sensors depicted in FIGS. 5 and 6, or any of the optical head configurations described herein. The number of exposure values is purely illustrative, and any number would be equally amenable to the methods described herein. Points 304a-304e represent the best exposure values for each sensor. For example in FIG. 3A, a best exposure value for frame 1, corresponding to sensor 302a, is 5. A best exposure value for frame 2, corresponding to sensor 302b, is 12. The images may appear truncated without adjusting the exposure of the images. FIGS. 3B-3D depict various methods for adaptively adjusting the best exposure values of the images.

FIG. 3B depicts linear interpolation between the best exposures of each sensor. An optimal exposure for each camera remains in the center of the frame and is linearly adjusted from a center of a frame to a center of an adjacent frame. For example, if frame 1 has a best exposure value of 5 (at point 40) and frame 2 has 12 (at point 42), the exposure values between the two center points (40 and 42) are linearly adjusted to gradually control the brightness of the frames. The exposure values between two center points 40 and 42 start at 5 and increase up to 12 linearly. With such a method, there may be some differences in brightness at the centers of each frame.

FIG. 3C depicts an alternative method for adjusting exposure values across the images. Similar to FIG. 2B, an optimal exposure for each camera remains in the center of the frame. In FIG. 3C, a spline interpolation between the best exposure values at the centers of the frames is shown, resulting in a panoramic view having fewer discontinuities or abrupt changes across the images.

FIG. 3D depicts yet another method for adjusting the best exposure value of each sensor. Best exposure values across seams (e.g., seam 50) are averaged. In some embodiments, a fraction of a length of a frame (e.g., 20% of the frame width) on both sides of a seam may be used to compute the average best exposure value for a seam. The best exposure value at the seam is adjusted to a calculated average best exposure. For example, in FIG. 3D, frame 1 has a best exposure value of 5 in zone X and frame 2 has a best exposure value of 11 in zone Y. The average of the best exposure values across seam 50 is 8. The best exposure value at seam 50 is adjusted to 8. The linear interpolation method as depicted in FIG. 3B may be used to linearly adjust the exposure values between point 52 and point 54 and between point 54 and point 56, etc. The result is a more gradual change of brightness from one frame to a next frame. In other embodiments, the spline interpolation method as depicted in FIG. 3C may be used to adjust the best exposure values between the same points (points 52-54).

In certain embodiments, an interpolated exposure value of the column in the first sensor nearest to the second sensor is substantially the same as an interpolated exposure value of the column in the second sensor nearest to the first sensor. One or more interpolated exposure values may be calculated based on a linear interpolation between the first and second exposure values. One or more interpolated exposure values may be calculated based on a spline interpolation between the first and second exposure values. In certain embodiments, at least one column in the first sensor has an exposure value equal to the first exposure value and at least one column in the second sensor has an exposure value equal to the second exposure value.

In certain embodiments, the methods may include disposing one or more additional charge-coupled device imaging sensors adjacent to at least one of the first and second sensor. In such embodiments, recording the image includes exposing the one or more additional sensors at a third exposure value and determining interpolated exposure values for columns between the one or more additional sensors and the first and second sensors based on the first, second and third exposure values.

In certain embodiments, a panoramic window is formed by a plurality of imaging sensors. The panoramic window may include a center window and steering window. The center window may tell a viewer where the center of the panoramic image is. In some embodiments, the center of a panoramic view is an arbitrarily selected reference point which establishes a sense of direction or orientation. Since a person's ability to interpret a 360-degree view may be limited, noting the center of a panoramic view helps a viewer determine whether an image is located to the right or left of a reference point.

In some embodiments, a separate screen shows the area enclosed by steering window. The separate screen may be a zoomed window showing a portion of the panoramic image. The steering window may be movable within panoramic window. The zoomed window may show the image contained in the steering window at a higher resolution. In this embodiment, a user wanting to get a closer look at a specific area may move the steering window to the area of interest within the panoramic window to see an enlarged view of the area of interest in the zoomed window. The zoomed window may have the same pixel count as the panoramic window. In some embodiments, the zoomed window may have a higher pixel count than the panoramic window.

The optical head may be a CMOS array of the type commonly used in the industry for generating a digital signal representing an image. In some embodiments, the optical head takes an alternate sensor configuration, including those depicted in FIGS. 5-8C. The CMOS digital output is fed into a multiplexer. In some embodiments, the multiplexer 210 receives data signals from the sensors in the optical head at low and high resolution. The data signal received at a low resolution forms the image shown in the panoramic window. The data signal received at a high resolution is localized and only utilized in the area that a user is interested in. Images selected by a steering window use the data signal received at a high resolution. The embodiments described herein allow an instant electronic slewing of high-resolution zoom windows without moving the sensors.

If the system used 3 Mega pixel sensors instead of 1.3 Mega pixel, even with a smaller steering window, the area selected by the steering window would show the selected image at a higher resolution. This image data may be transferred by the multiplexer 210 to the memory 212. In some embodiments, the image presented in the zoomed window may be stored in a memory for later processing.

Figure 4A:
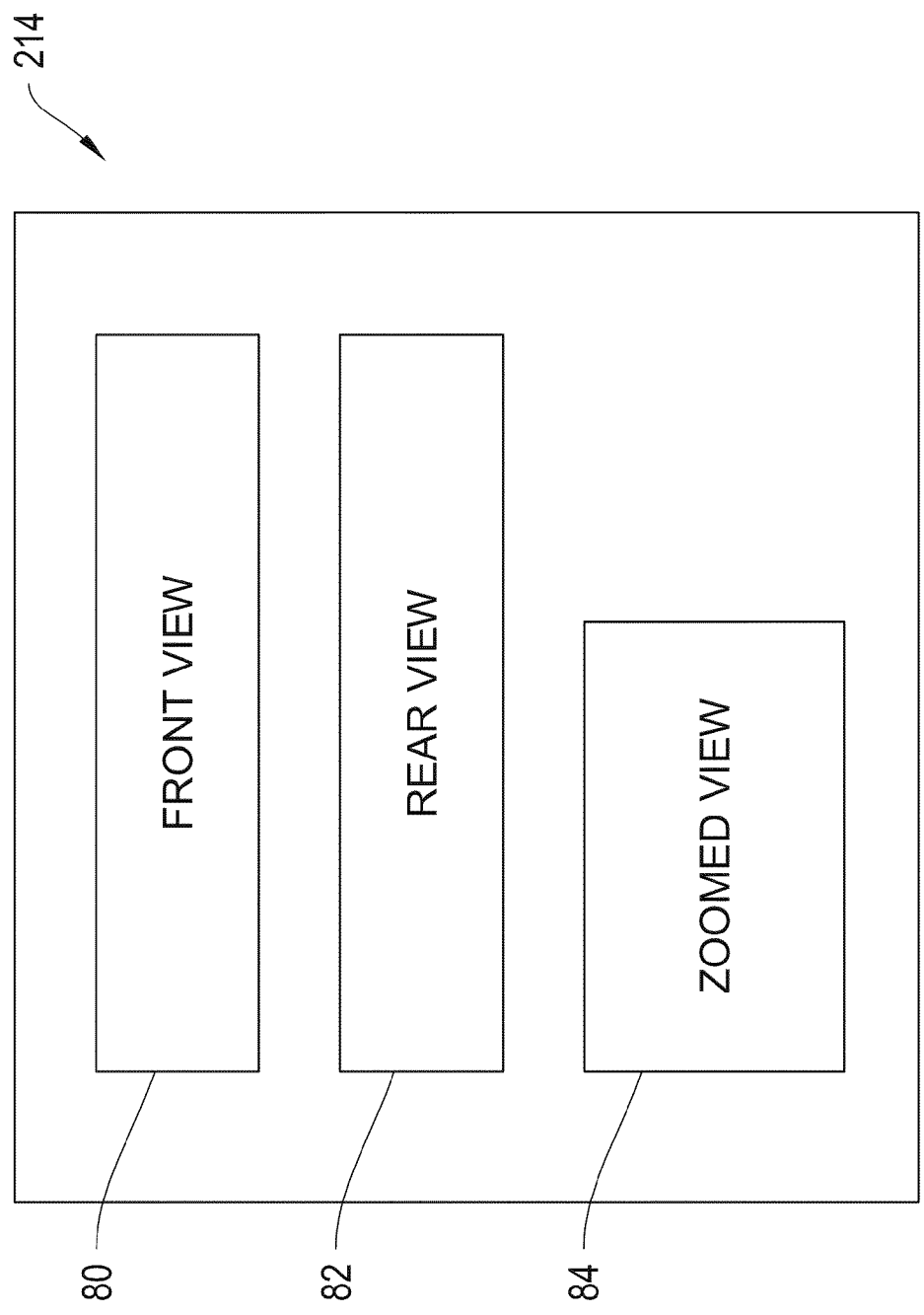

In some embodiments, it may be helpful to split a 360-degree view into two 180-degree views: a front view and a rear view. For example, a 360-degree view having 1064×128 pixels may be split into two 532×128 pixel views. FIG. 4A-4B show different embodiments of a display (e.g., the display 214 of FIG. 2) having three windows: a front-view window 80, a rear-view window 82, and a zoomed window 84. The windows may be arranged in any logical order. In FIG. 4A, the windows are vertically arranged with the front-view window 80 at the top, the rear-view window 82 in the middle, and the zoomed window 84 at the bottom. In FIG. 4B, the zoomed window 84 may be positioned between the front-view window 80 and the rear-view window 82.

Figure 4C:
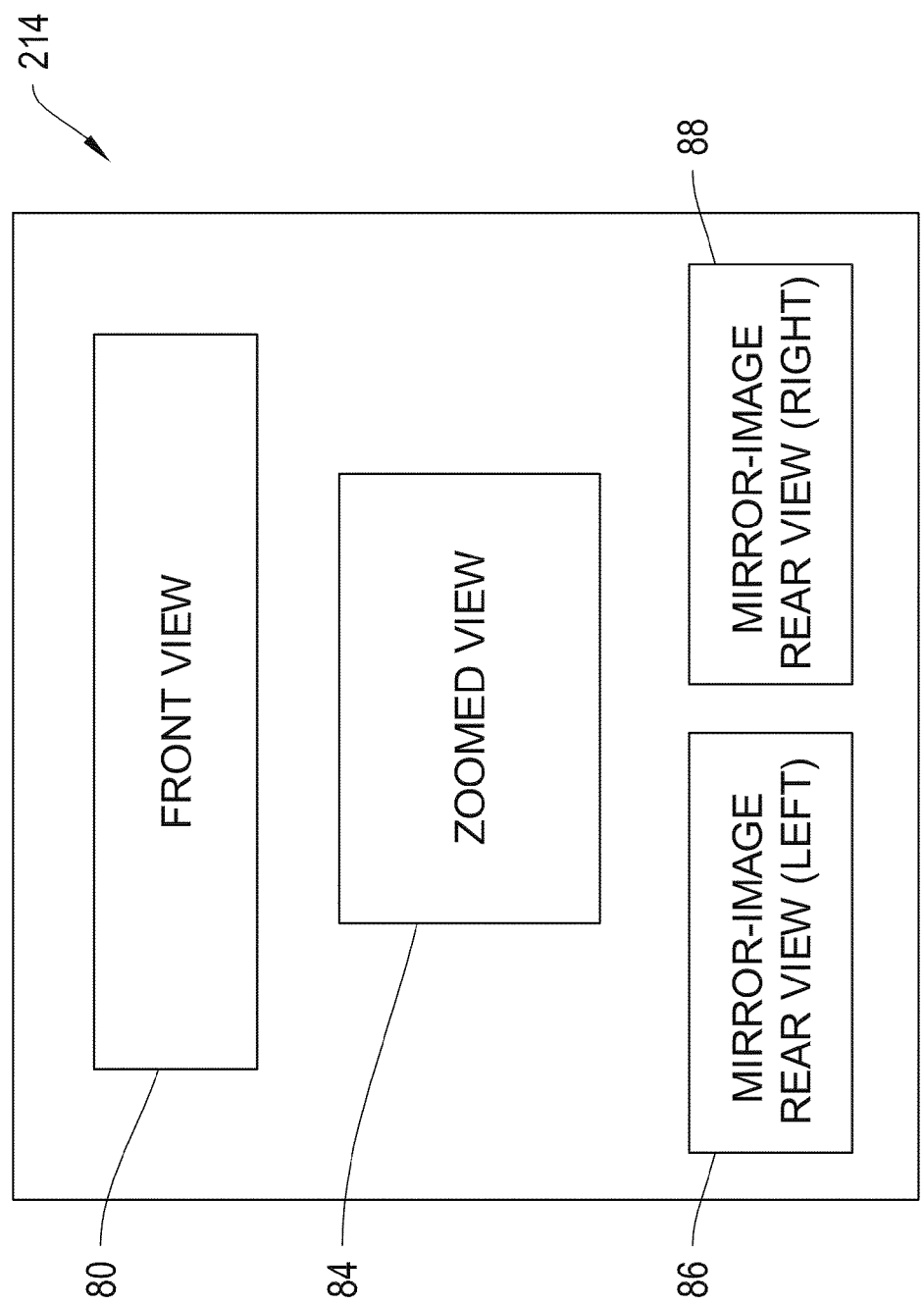

In some embodiments, a mirror image of a rear-view image may be shown in a rear-view window since most people are accustomed to seeing views that they cannot see using mirrors such as a rear-view mirror in a car. FIG. 4C depicts the display 214 with two windows showing mirror-image rear views (86 and 88). In this embodiment, the rear view captured by the imaging sensors is divided into left and right rear views. However, in other embodiments, the mirror-image rear views may be presented in a single window.

As discussed above, parallax distortion results from separation of the entrance pupils of the individual imaging sensors, and generally depends upon the location of the entrance pupils and the relative orientations of the axes through each of the entrance pupils (referred to as the optical axes). The choice of an appropriate arrangement depends on many factors, including, among other things, distortion reduction, ease of manufacturing, size of the resulting optical head, mechanical and electrical connection limitations, and application-specific limitations. A common practice for arranging multiple imaging sensors in an optical head for producing a panoramic image of a scene is to arrange them side-by-side into a fanned array, in which the optical axes are radial to a point. Such an embodiment, as depicted in FIG. 2, has advantageous distortion properties. However, many applications require an optical head with a small physical footprint. The physical footprint of a device generally refers to a dimension of the device, e.g. the area of the base of the device or the vertical height of the device. Considering an optical head's physical footprint is important in many applications with size and position constraints. For example, optical heads that are to be mounted in narrow places, such as the corner of a room or within a rack of surveillance equipment, will preferentially have a correspondingly small base.

In certain embodiments, imaging sensors in an optical head are arranged both horizontally and vertically in order to minimize parallax distortion while satisfying geometrical and mechanical constraints on the optical head.

Figure 5:
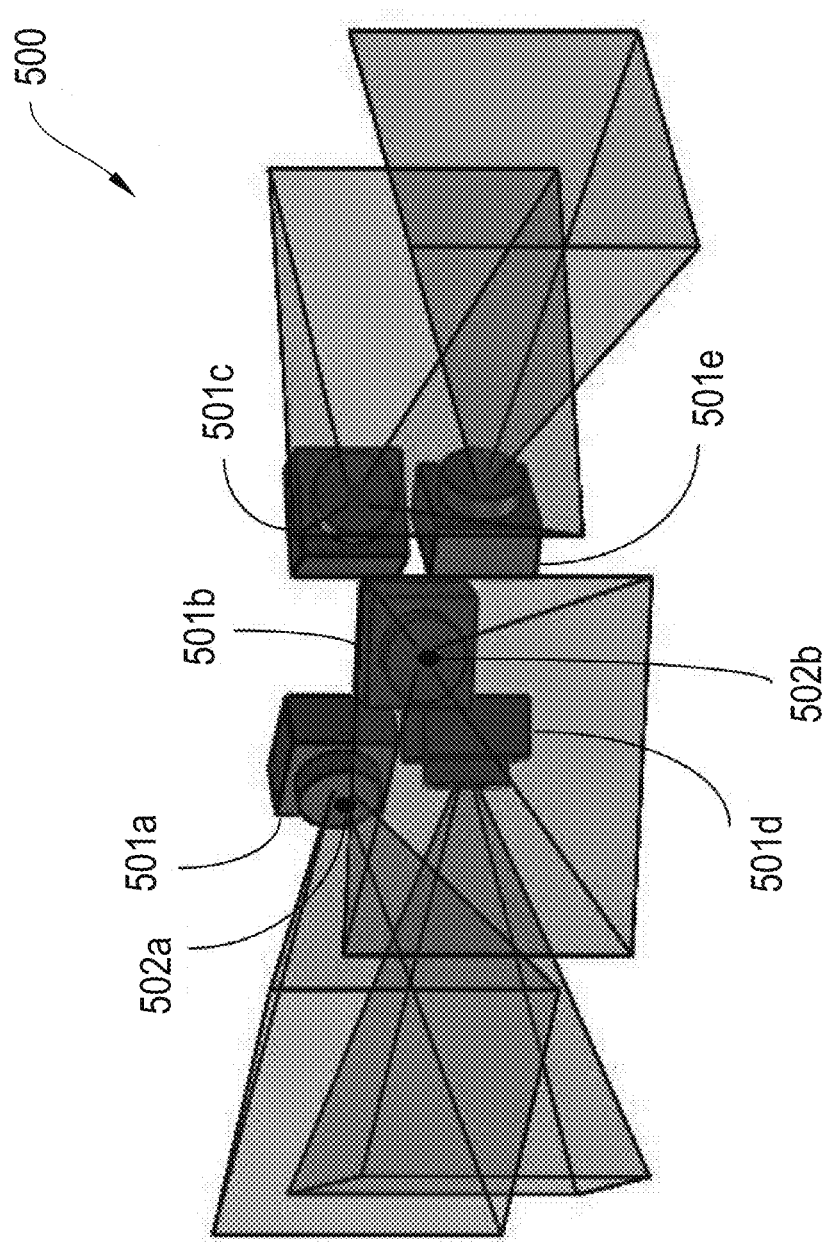
FIG. 5 depicts a first optical head having five imaging sensors, according to an illustrative embodiment.

FIG. 5 depicts a first optical head 500 having five imaging sensors 501a-501e, according to an illustrative embodiment. Such an optical head can be readily used in an imaging system such as the system 200 or the system 100. In some embodiments, the imaging sensors in the optical head are arranged so that the configuration exhibits minimum total parallax for all of the combinations of imaging sensors when taken pair-wise. The arrangement of the imaging sensors 501a-501e in the optical head 500 of FIG. 5 is one configuration that satisfies this minimum total parallax condition in accordance with the systems and methods described herein. In some embodiments, the imaging sensors in the optical head are positioned so that the distance between their entrance pupils is minimized (e.g. entrance pupils 502a and 502b for imaging sensors 501a and 501b, respectively) when compared to the footprint of the optical head 500. The particular embodiment illustrated in FIG. 5 also satisfies this criterion. In some embodiments, more or fewer than five imaging sensors may be arranged to satisfy this criterion. In other embodiments, the imaging sensors are arranged so that the distance between their entrance pupils is minimized when compared to another geometric or mechanical constraint on the optical head 500, such as the height of the optical head 500, the volume of the optical head 500, the shapes of the imaging sensors comprising the optical head 500, an angular limitation on the orientations of the imaging sensors (e.g., the imaging sensors 501a-501e), or the manufacturability of the optical head 500. In some embodiments, the imaging sensors are arranged so that the configuration exhibits minimum total parallax for all pairs of adjacent imaging sensors. Two imaging sensors may be considered adjacent when they are, for example, horizontally abutting, vertically abutting, within a given proximity of each other or disposed proximally as part of a regular pattern of imaging sensors.

In some embodiments, the optical head includes imaging sensors arranged in rows. In further embodiments, each row of imaging sensors is disposed substantially vertically of another row. For example, the optical head 500 includes a first row of sensors (e.g., sensor 501d and sensor 501e), a second row of sensors (e.g., sensor 501b) and a third row of sensors (e.g., sensor 501a and sensor 501c). In certain embodiments, an optical head has two rows of imaging sensors in which the optical axes of the sensors in the first row lie substantially on a first plane and the optical axes of the sensors in the second row lie substantially on a second plane. In certain embodiments, the first plane is substantially parallel to the second plane. Additionally, the number of imaging sensors in the first and second row may be different. The optical head 500 has rows of imaging sensors satisfying these criteria. For example, a first row of sensors including the sensor 501d and the sensor 501e has optical axes that form a plane, with that plane being substantially parallel to a plane containing the optical axes of the sensors in a second row (e.g., the sensor 501b). In certain embodiments, each row corresponds to such a plane, and all such planes are substantially parallel. In some embodiments, two rows are able to image different horizontal ranges of the scene, and these horizontal ranges may overlap.

Figure 6:
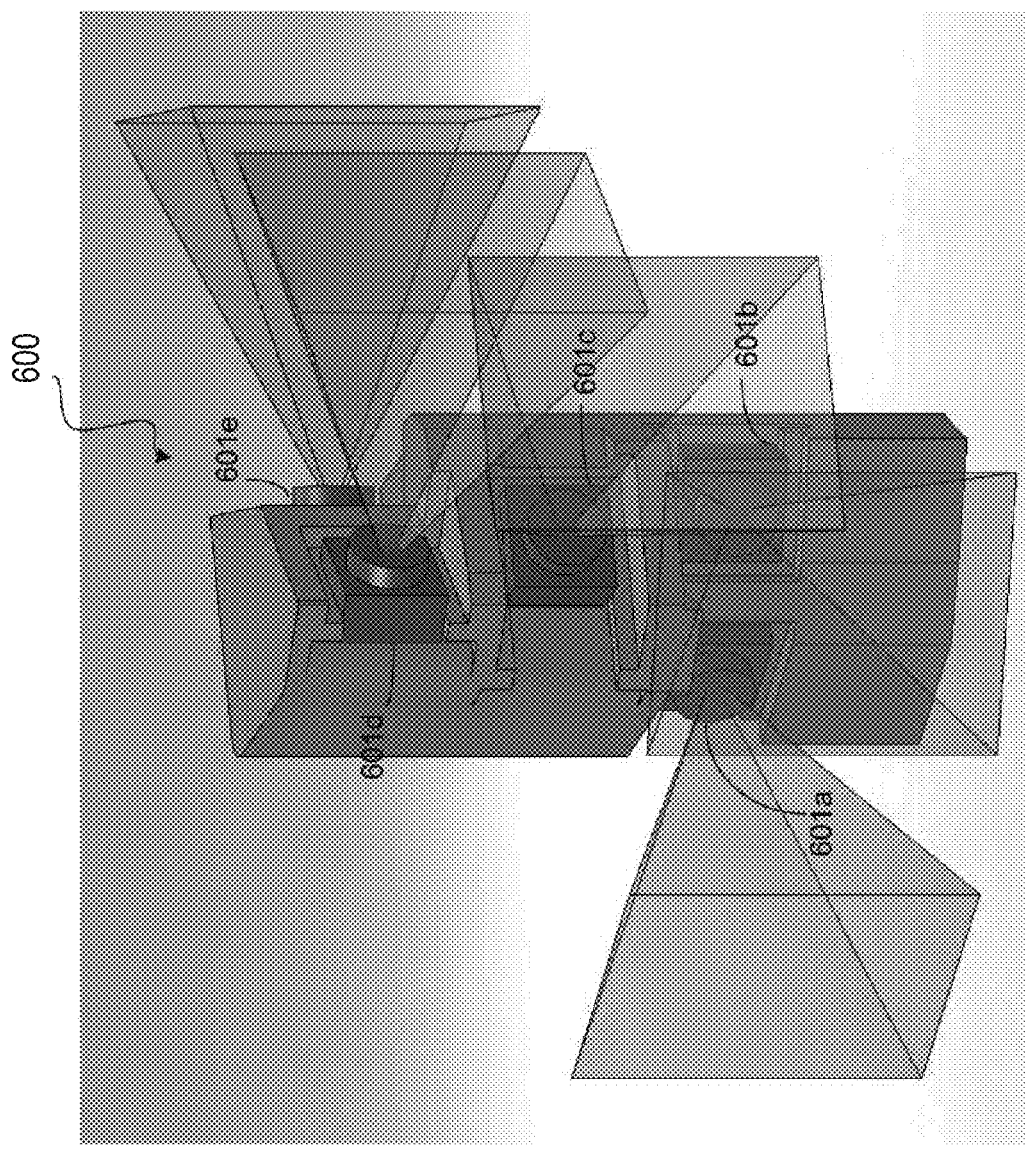
FIG. 6 depicts a second optical head having five imaging sensors, according to an illustrative embodiment.

FIG. 6 depicts a second optical head having five imaging sensors, according to an illustrative embodiment. The arrangement of the imaging sensors 601a-601e in the optical head 600 is another configuration that satisfies the minimum total parallax condition described above. In some embodiments, the imaging sensors in the optical head are further arranged so that the configuration introduces parallax in one dimension only for adjacent camera modules. This requirement allows for simpler parallax correction when the composite image is created, for example, by processor 114 or an external computing device connected via a communications interface as described above. The arrangement of the imaging sensors 601a-601e in the optical head 600 is one configuration that satisfies this one-dimensional parallax requirement. More or fewer than five imaging sensors may be arranged to satisfy this criterion. In other embodiments, the imaging sensors are arranged to satisfy the one-dimensional parallax requirement while satisfying a geometric or mechanical constraint on the optical head 600, such as the height of the optical head 600, the volume of the optical head 600, the shapes of the imaging sensors comprising the optical head 600, an angular limitation on the orientations of the imaging sensors, or the manufacturability of the optical head 600.

The sensors 601a-601e of the optical head 600 of FIG. 6 can be identified as distributed through three rows of sensors; a bottom row including the sensors 601a and 601b, a middle row including the sensor 601c and a top row including the sensors 601d and 601e. In some embodiments, a rightmost imaging sensor in the bottom row is disposed substantially directly below one imaging sensor in the middle row, and the one imaging sensor in the middle row is disposed substantially directly below the leftmost imaging sensor in the top row.

FIGS. 5 and 6 depict optical heads with wide composite fields-of-view, achieved by assembling the images produced by each of the imaging sensors 501a-501e and 601a-601e, respectively. In some embodiments, the horizontal range of the field-of-view of the optical head will be about 180 degrees. In some embodiments, the horizontal range of the optical head will be 360 degrees. In general, the imaging sensors may be arranged to achieve any horizontal field-of-view that encompasses a particular scene of interest.

Figures 7A, 7B:
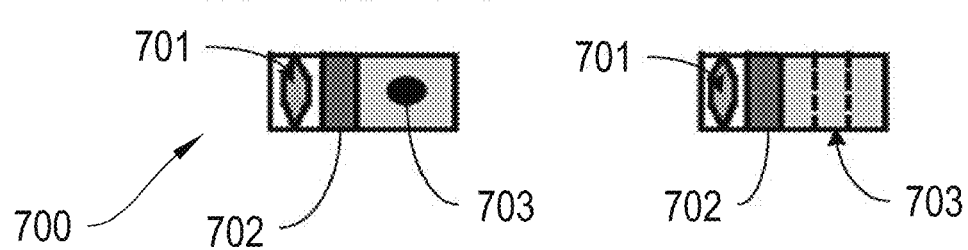
FIGS. 7A-7B depict top and side views of a single imaging sensor module for use in an optical head, according to an illustrative embodiment.

FIGS. 7A-7B depict top and side views of a single imaging sensor module 700 for use in an optical head, according to an illustrative embodiment. The top view of the sensor module of FIG. 7A includes an imaging sensor 701 mounted within a module body 702. The imaging sensor 701 may be any of a variety of types of imaging sensors, such as those described with reference to the imaging sensors 102a, 102b and 202a-202h above. The imaging sensor 701 may also include more than one imaging sensor, each of which may be positioned at a particular angle and location within the module body 702. The module body 702 of FIG. 7A also includes a hole 703, which may be used for assembling multiple sensor modules into an optical head, as will be discussed below. In some embodiments, the module body 702 may not include a hole, and may include mechanical connection mechanisms for assembling multiple sensor modules into an optical head. In some embodiments, each module body 702 may include mechanical connection mechanisms for attaching two sensor modules to each other, such as interlocking mounting pins.

The sensor module 700 may include circuitry for controlling the imaging sensor 701, processing circuitry for receiving image data signals from the imaging sensor 701, and communication circuitry for transmitting signals from the imaging sensor 701 to a processor, for example, the processor 114. Additionally, each module body 702 may include movement mechanisms and circuitry to allow the sensor module 700 to change its position or orientation. Movement of the sensor module 700 may occur in response to a command issued from a central source, like processor 114 or an external device, or may occur in response to phenomena detected locally by the sensor module 700 itself. In one embodiment, the sensor module 700 changes its position as part of a dynamic reconfiguration of the optical head in response to commands from a central source or an external device. In another embodiment, the sensor module 700 adjusts its position to track a moving object of interest within the field-of-view of the imaging sensor 701. In another embodiment, the sensor module 700 adjusts its position according to a schedule. In other embodiments, only the imaging sensor 701 adjusts its position or orientation within a fixed sensor module 700. In further embodiments, both the sensor module 700 and the imaging sensor 701 are able to adjust their positions.

Figure 7C:
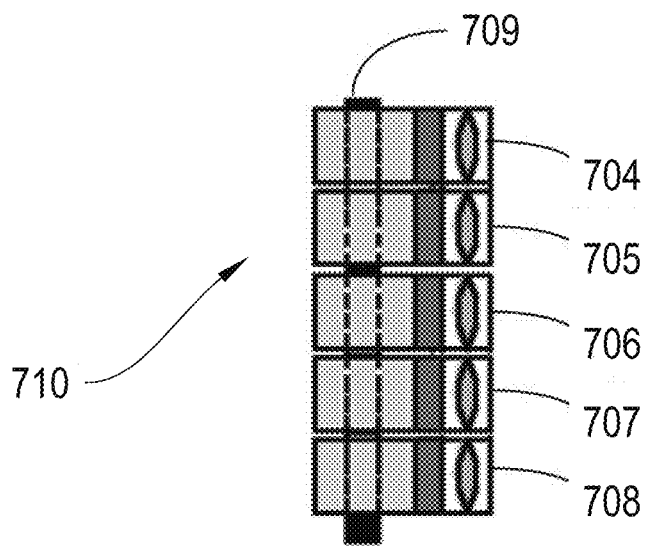
FIG. 7C depicts a side view of an arrangement of sensor modules in a stacked array to form an optical head, according to an illustrative embodiment.

FIG. 7C depicts a side view of an arrangement of sensor modules in a stacked array to form an optical head 710, according to an illustrative embodiment. The imaging sensors 704-708 are disposed vertically adjacent to one another when the optical head 710 is viewed from the side. In the embodiment of FIG. 7C, a mounting rod 709 runs through the hole 703 in each module body. In some embodiments, each sensor module 700 can be rotationally positioned when mounted on the mounting rod 709 at an offset angle from an arbitrary reference point. In some embodiments, each of the sensor modules can be locked in position on the mounting rod 709, either temporarily or permanently. In some embodiments, the optical head 710 is reconfigurable by repositioning each sensor module 700. In some embodiments, each sensor module 700 is capable of being rotationally positioned about a longitudinal optical head axis without the use of a mounting rod 709. This longitudinal axis may be horizontal, vertical, or any other angle. The depiction of five sensor modules 704-708 in FIG. 7C is merely illustrative, and any number of sensor modules may be used in accordance with the systems and methods described herein.

Figures 7D, 7E:
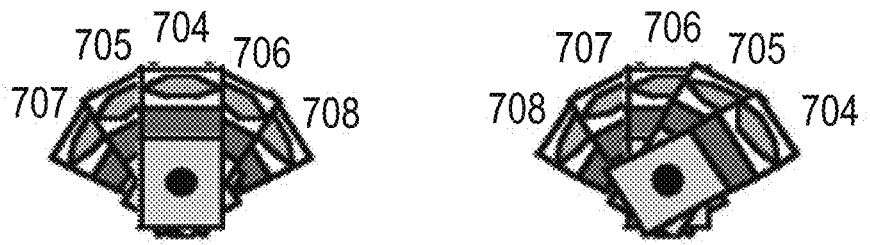
FIGS. 7D-7E depict top views of two fanned arrangements of multiple imaging sensors in a stacked array, according to an illustrative embodiment.

FIGS. 7D-7E depict top views of two fanned arrangements of multiple imaging sensors in a stacked array, according to illustrative embodiments. In these embodiments, a wide composite field-of-view is achieved by assembling the images produced by each of the imaging sensors 704-708 which are oriented at various offset angles. In some embodiments, the horizontal field-of-view of the optical head will be about 180 degrees. In some embodiments, the horizontal field-of-view of the optical head will be 360 degrees. In some embodiments, the sensor modules 704-708 will be arranged to achieve a horizontal field-of-view that encompasses a particular scene of interest.

Figure 8A:
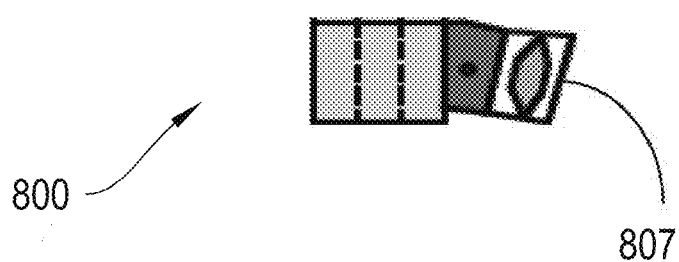
FIGS. 8A-8C depict a single tilted imaging sensor and various arrangements of such sensors in a stacked array, according to an illustrative embodiment.
Figure 8B:
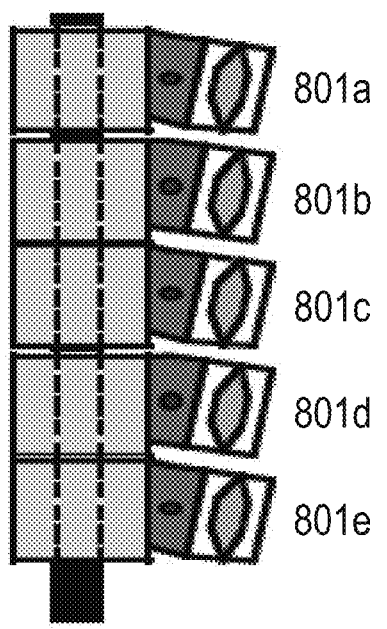
Figure 8C:
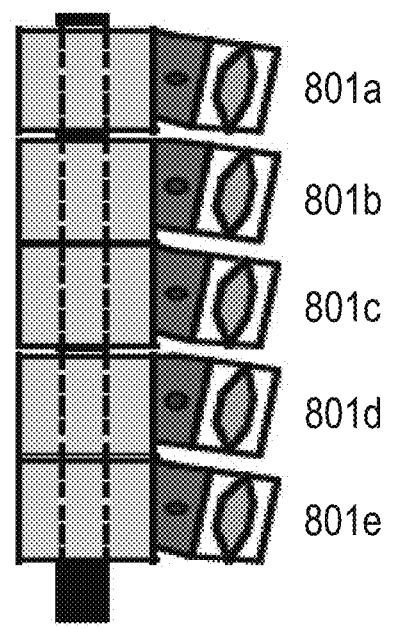

FIGS. 8A-8C depict a single tilted imaging sensor and various arrangements of such sensors in a stacked array, according to illustrative embodiments. For certain surveillance applications, such as an optical head that is to be mounted high up and which needs to look downwards, each individual sensor module 800 can be constructed such that the imaging sensor 807 has a downwards tilt at a tilt angle. Such an imaging sensor module 800 is depicted in FIG. 8A. The imaging sensor module 800 may include the same components as the sensor module 700.

FIGS. 8B-8C depict side views of a stack of imaging sensor modules 801a-801e forming an optical head 810 according to two embodiments. In these embodiments, the optical head 810 has a downwards angle of view. At the same time, the imaging sensors 801a-801e that point to the sides maintain a horizontal horizon line. This is depicted in the side view of the optical head 810 of FIG. 8C. In some embodiments, an individual sensor module 800 has an imaging sensor 807 with an upwards tilt. The tilt angle of a sensor module 800 can be any angle suitable for a desired application. In some embodiments, the tilt angles of each individual sensor module 800 in an optical head 810 are identical. In one embodiment, the tilt angle of the sensor module 800 is approximately 10 degrees below horizontal. In some embodiments, the tilt angles of each individual sensor module 800 are chosen so that the optical head 810 has a field-of-view including a vertical angular range.

Figure 9:
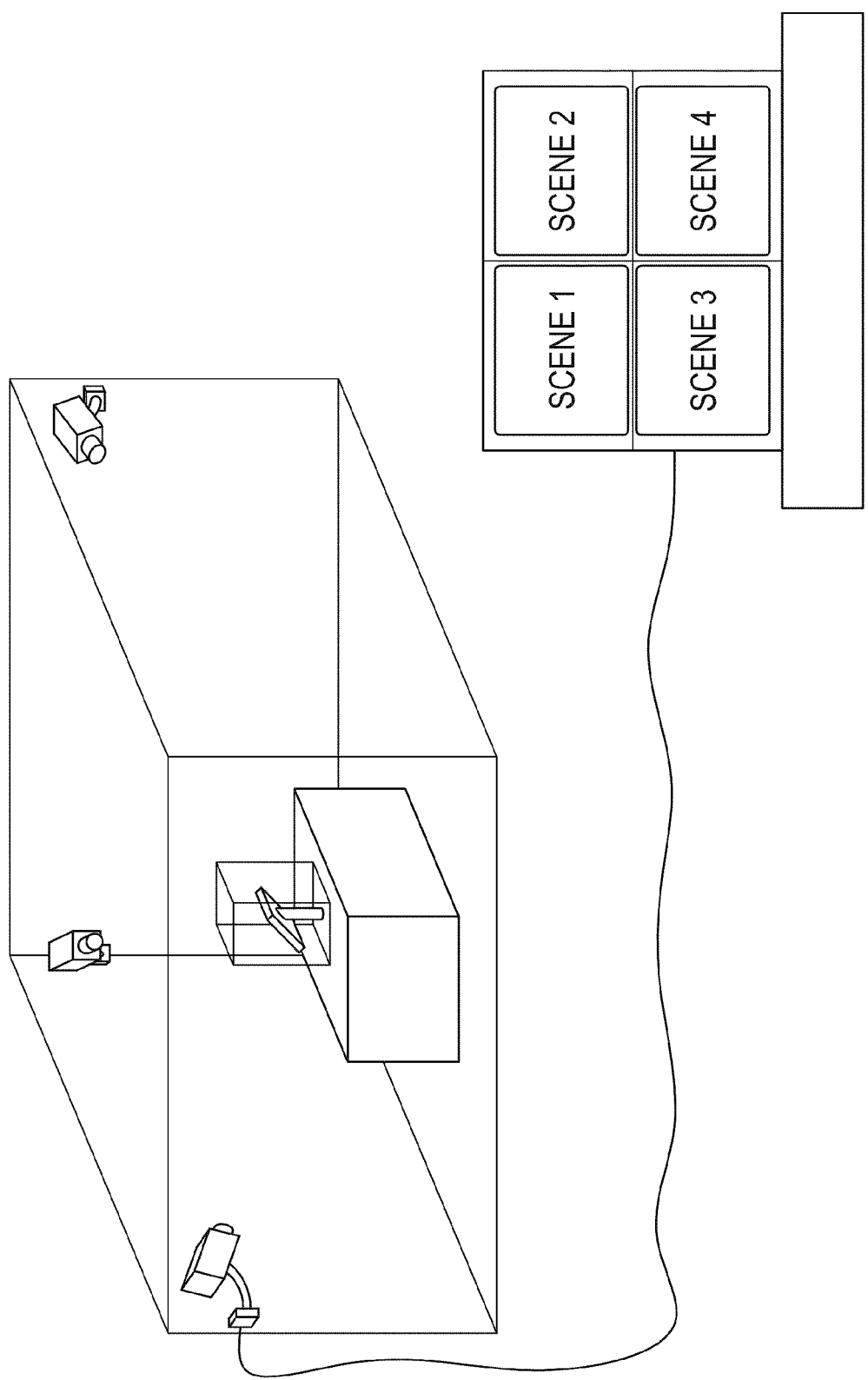
FIG. 9 depicts a conventional video security system.

FIG. 9 shows one application for the panoramic camera. To this end, FIG. 9 depicts a conventional video security system having a layout of the kind one sees at a museum. Within a room, there are four cameras, each capturing a portion of the room under surveillance. In this prior art system, each camera is a conventional analog camera with an electro-mechanical pan, tilt and zoom (PTZ) feature and each camera connects into an existing closed-circuit television network. The images from each camera are displayed as different scenes on a series of television monitors maintained in a security office. These multiple images, if the cameras are correctly positioned in the room, provide a full image of the room. Close-up images are collected by sending a signal to the camera to zoom in. When this happens, an electro mechanical assembly adjust the camera lens so that a close up image is captured and displayed on one of the monitors.

Figure 10:
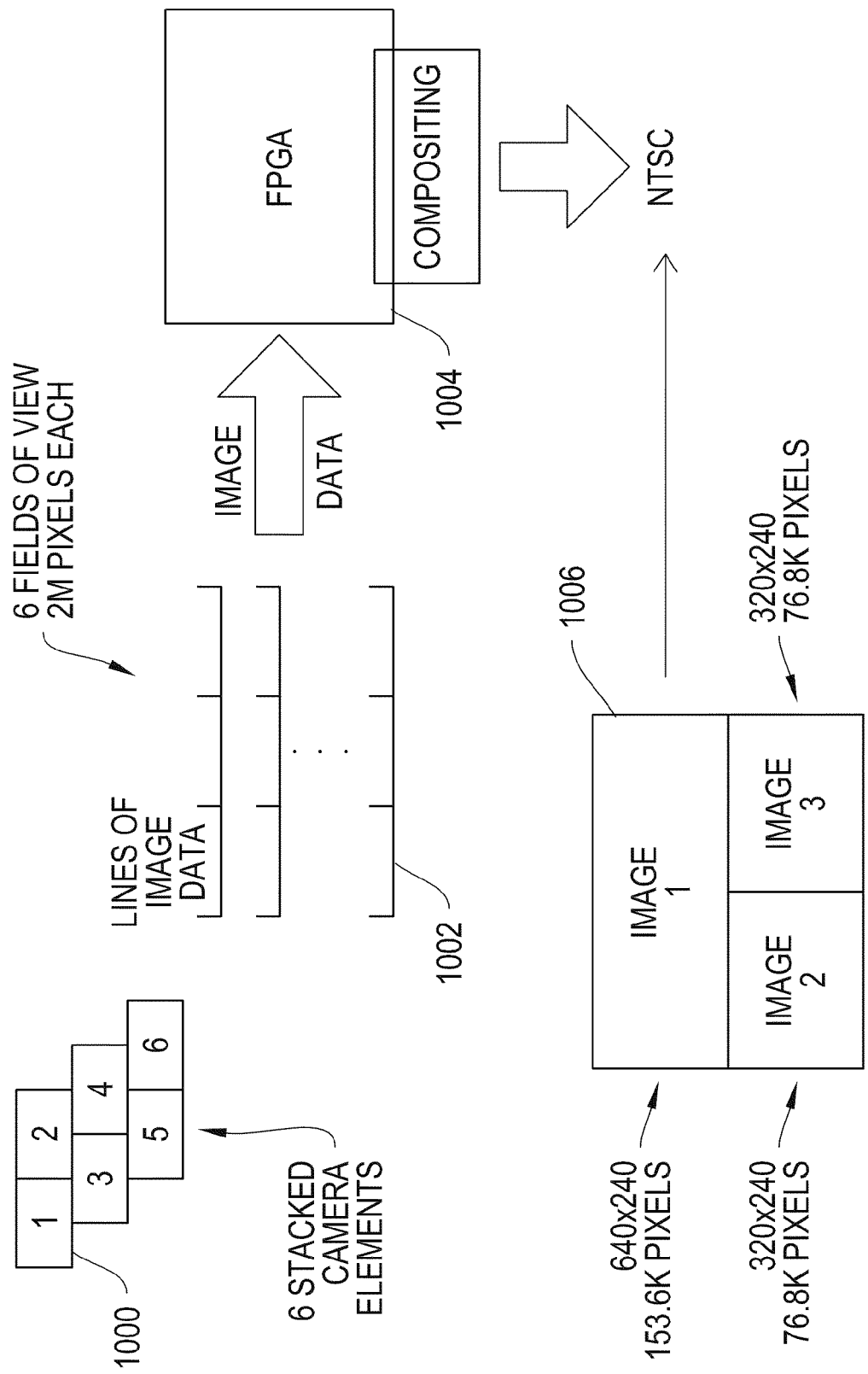
FIG. 10 depicts pictorially, a digital camera having an analog backend, according to an illustrative embodiment.

One application of the digital security camera is to replace the multiple cameras and displays with a single or reduced number of digital cameras that connect into the closed-circuit television (CCTV) network already in place. FIG. 10 depicts pictorially the operation of the camera backend that will make the camera compatible with the physical layer of the CCTV network.

As an example, FIG. 10 shows six stacked camera elements to represent the camera elements 1000, which are camera elements arranged similar to the camera elements shown in FIG. 6. Essentially, the front end of this camera is identical to the front end of the camera depicted in FIG. 6. As with the camera shown in FIG. 6, the elements can be controlled to implement a rolling shutter that reads out lines of data 1002 from the camera elements. These lines of image data may be dumped into a video memory. In this example, the video memory is part of an FPGA device 1004, but any suitable video memory can be used. This camera can be operated in a video mode so that it captures video rate images, such as images at a rate of 30 images per second.

The captured image is a high resolution panoramic image of the room under surveillance. In some embodiments, each camera element has a resolution ranging from about 0.075 Mega pixels to about 2 Mega pixels. In some embodiments, one or more camera elements have a resolution higher than 2 Mega pixels. For example, each of the camera elements in this example is a 2 Mega pixel element. Thus, the six elements have captured a 12 Mega pixel image of the room and have stored 12 Mega pixels of image data. The FPGA has logic implemented to substantially down sample the 12 Mega pixels of the stored image to create an image signal that is compatible with the 640×480 image format of NTSC television. The FPGA down samples the stored image using a suitable down sampling technique. In some embodiments, the FPGA down samples the stored image by choosing every Nth pixel in the image. In some embodiments, the FPGA determines a set size based on the specified resolution, e.g., 640× 480, and arranges the image pixels into multiple sets of the determined set size. The FPGA may average the pixels in each set to obtain a down sampled image. Alternatively, the FPGA may apply another mathematical function, e.g., a weighted average, to each set to obtain a down sampled image. In an embodiment with low resolution camera elements, down sampling may not be required in order to provide an image compatible with the 640×480 NTSC format. This format supports the delivery of 307.2K pixel (=640 pixel×480 pixel) images delivered at a frame rate of about 30 frames per second. The FPGA then runs an analog conversion process that converts the digital video signal to an analog video signal that is NTSC compatible and that may be delivered over the CCTV network for display on monitors of the type shown in FIG. 9. For example, the analog video signal may have a format similar to that of image 1006. Further description regarding the FPGA's image processing and analog conversion capabilities is provided with reference to FIG. 11 below.

Figure 11:
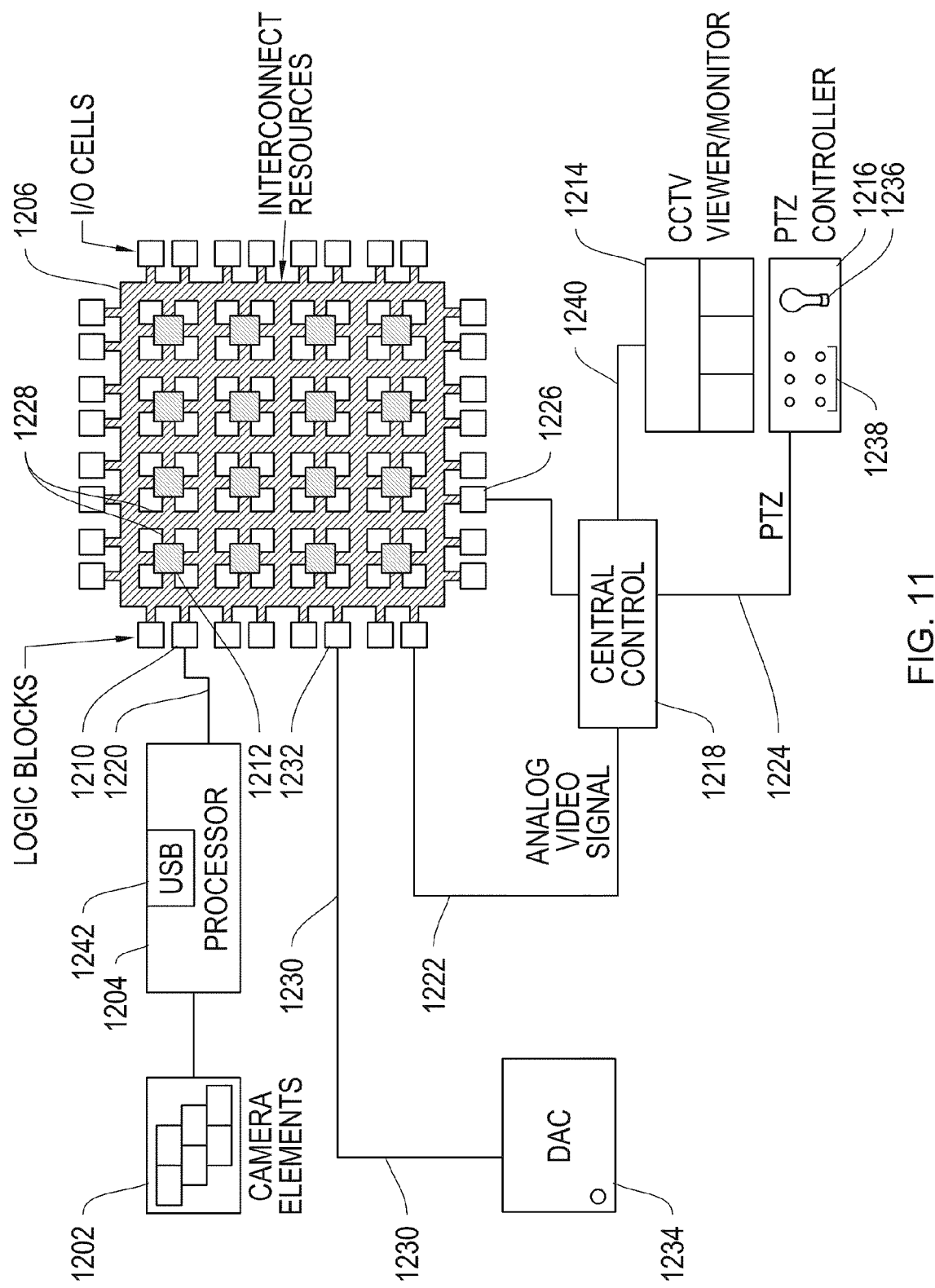
FIG. 11 depicts a digital camera having an analog backend, according to another illustrative embodiment.

FIG. 11 shows another embodiment of a digital security camera, including an analog backend to make the camera compatible with the physical layer of a CCTV network. Since the digital security camera is compatible with a CCTV network, a user may replace moving cameras in the CCTV network with this digital security camera. In this embodiment, the digital camera includes an optical head 1202 having six camera elements (similar to elements in FIG. 1A), a processor 1204, and a Field-Programmable Gate Array (FPGA) 1206. Optical head 1202 can be operated in a video mode so that it captures video rate images, such as images at a rate of 30 images per second. Each camera element is a high resolution sensor having, e.g., a 2 Mega pixel resolution. In some embodiments, optical head 1202 includes one camera element. The camera element may be a high-pixel count image sensor. Optical head 1202 having a single camera element may be operated in a video mode so that it captures video rate images, such as images at a rate of 30 images per second. Each camera element may be a CMOS imaging sensor manufactured by, e.g., Aptina®, OmniVision®, or any CMOS imaging sensor manufacturer. A CMOS imaging sensor may include an integrated circuit containing an array of pixel sensors. The integrated circuit is produced by a CMOS manufacturing process. CMOS imaging sensors have been conventionally used in cell phone cameras, web cameras, and even high-quality digital cameras. For example, each camera element may be an Aptina® MT9D014D00STC imaging sensor. This camera element has a 2 Mega pixel resolution and can capture images at up to 30 frames per second.

Processor 1204 includes image memory to hold captured image data from optical head 1202. The captured image data is a high resolution panoramic image of the room under surveillance. In some embodiments, processor 1204 processes the data in the image memory to create multiple video images. The processor may combine the multiple video images into a single video stream for transport over the physical layer of a video network. In this embodiment, the processor sends the video stream to an analog communications port implemented in FPGA 1206.

Analog security cameras in a CCTV network typically cannot provide motion tracking capabilities due to their analog video output. However, since the systems and methods described herein output a digital video stream, the video stream may be processed to perform motion tracking. Integrating a digital security camera in an analog CCTV network advantageously provides motion tracking capabilities previously unavailable in such networks. In some embodiments, each analog security camera is replaced with a digital security camera having a single camera element. For example, the digital security camera may be a conventional digital camera. In some embodiments, the analog security cameras in the CCTV network are replaced with one or more digital security cameras having multiple camera elements as described with reference to FIGS. 5-8C. The systems and methods described herein provide motion tracking capabilities for such CCTV networks and variations thereof.

Processor 1204 may perform motion tracking on the panoramic images received from optical head 1202. In some embodiments, a panoramic image from optical head 1202 is stored in the video memory. When the next panoramic image is received, processor 1204 compares the two images for indicators of motion using, e.g., a blob tracking algorithm, a contour tracking algorithm, or any other suitable motion tracking algorithm. Processor 1204 may request input from a user regarding a selection of a motion tracking algorithm. The selection of motion tracking algorithm may be based on the type of motion being targeted. For example, the blob tracking algorithm may be suitable for detecting human movement, while the contour tracking algorithm may be suitable for object movement. For example, processor 1204 may compare the two images using the contour tracking algorithm. Processor 1204 chooses a subset of pixels randomly, as specified by the algorithm. Processor 1204 compares the same subset of pixels from each of the two images by subtracting one set from the other. If non-zero pixel values are observed, they may indicate motion. Processor 1204 applies a contour tracking particle filter to the subsets of pixels in order to estimate locations of motion in the image. Processor 1204 may mark portions of the current panoramic image to indicate areas of motion before including it in a video stream.

FPGA 1206 is a reprogrammable device readily available from manufacturers such as Lattice®, Xilinx® and Altera®. For example, FPGA 1206 may be a Lattice® LFXP2-5E-5TN144C FPGA. FPGAs are generally reconfigurable by a buyer after manufacturing. FPGA 1206 contain programmable logic blocks 1212 and a hierarchy of reconfigurable interconnects 1228 that allow the blocks to be wired together in many different configurations. Logic blocks 1212 may be configured to perform complex combinational functions, or simple logic gates, e.g., AND and XOR. Logic blocks 1212 also include memory elements, which may be simple flip-flops or larger blocks of memory. The FPGA configuration is generally specified using a hardware description language (HDL). Examples of HDLs include AHDL, VHDL, and Verilog. The user uses the HDL to write an executable specification of a piece of hardware, e.g., an adder. The HDL specification is downloaded to the FPGA in order to configure Logic blocks 1212 and reconfigurable interconnects 1228. FPGA 1206 communicates with the outside world via input/output (I/O) cells, e.g., I/O cells 1210 and 1226. FPGA 1206 may use the I/O cells for receiving HDL specification for initial configuration, as well as input and output during operation of the configured FPGA. For example, FPGA 1206 may receive input from processor 1204 and/or digital-to-analog converter 1234, and send output to central server 1218. In some embodiments, processor 1204 may also be an FPGA device, e.g., a Lattice® LFE3-70E-6FN484C. In some embodiments, hardware functionality for processor 1204 may be implemented in FPGA 1206 such that FPGA 1206 perform functions associated with processor 1204.

The HDL specification for FPGA 1206 may be adapted to perform the below described functions of an analog communications port. For example, FPGA 1206 receives, a digital video stream with a resolution of 12 Mega pixels. FPGA 1206 includes image memory that stores an image of the digital video stream as it is received from processor 1204. The stored image is down sampled, e.g., by averaging sets of pixels or choosing every Nth pixel, in the image. The image is down sampled to, e.g., a resolution of 640×480 corresponding to the NTSC format. The image is further broken down into two fields, the first field including the even rows in the image, and the second field including the odd rows in the image. The two fields are interlaced according to the NTSC format when viewed on an NTSC-compatible television. The processed image is sent to a digital-to-analog converter (DAC), e.g., DAC 1234. DAC 1234 converts the digital signal of the image into an analog signal compatible with, e.g., an analog closed-circuit television (CCTV) network. FPGA 1206 then redirects the analog signal to the CCTV network. For example, a central control (e.g., central control 1218) receives the analog signal and may forward the signal for display on a television monitor.

In some embodiments, the HDL specification for FPGA 1206 is adapted to receive and decode Pan-Tilt-Zoom (PTZ) encoded command signals as described below. Even though the PTZ encoded command signals are intended for an analog camera that physically zooms, tilts, or pans the analog camera based on the commands, the system described herein repurposes the PTZ encoded command signals to extract the appropriate samples from the captured panoramic image. The PTZ commands may be transmitted from a PTZ controller via a serial interface standard, e.g., RS-232 or RS-485. The PTZ commands may be encoded in a PTZ camera communication protocol, e.g., Pelco® D, Pelco® Z, or any other suitable communication protocol. FPGA 1206 receives PTZ encoded command signals as an input and decodes the signals for the purpose of controlling image processing of the digital video stream. FPGA 1206 extracts PTZ commands, e.g., Pelco® D commands, from the RS-485 encoded signal. FPGA 1206 then interprets the PTZ commands for pan, tilt, and/or zoom requests. For example, a PTZ command may request a 2× zoom in the image designated for control via the PTZ controller.

FPGA 1206 relays the 2× zoom request to processor 1204, which has been sending the digital video stream to FPGA 1206. Processor 1204 creates new composite images for the digital video stream based on the PTZ request. Processor 1204 extracts an appropriate sample of the panoramic image from the video memory such that the view is magnified 2×, and creates a new composite image including the extracted sample. In further instances of pan, tilt, or zoom requests, processor 1204 extracts the appropriate samples of the panoramic image and creates a new composite image. Even though the PTZ encoded command signals are intended for an analog camera that physically zooms, tilts, or pans the analog camera based on the commands, the system described herein repurposes the PTZ encoded command signals to extract the appropriate samples from the captured panoramic image. The system may further repurpose PTZ encoded command signals to perform functions not typically associated with an analog PTZ camera. For example, some analog PTZ cameras have commands to manually control the opening and closing of an iris shutter installed on the camera, e.g., to adjust light exposure. The system described herein may repurpose iris control commands to perform functions such as initializing the system or adjusting exposure values of the camera elements. In some embodiments, the HDL specification for FPGA 1206 may be adapted such that the logic associated with processor 1204 described above is included in FPGA 1206.

HDL specification for an analog communications port, as described above, is downloaded into FPGA 1206 via I/O cells 1210 to configure FPGA 1206 as an analog communications port. FPGA 1206 is in communication with processor 1204 via wires 1220 and receives a digital video stream from processor 1204. Logic blocks 1212 receive portions of the video stream via interconnect 1228, and process the digital video stream to send to a digital-to-analog converter (DAC) 1234. For example, logic blocks 1212 may convert the digital video stream into a 640×480 image format compatible with the NTSC format. Logic blocks 1212 then send the digital video stream for conversion into an analog video stream suitable for display on a television video monitor. For example, the analog video stream may be compatible with the NTSC (640× 480) or PAL (640×576) formats. FPGA 1206 communicates with DAC 1234 via wires 1230. DAC 1234 may be an AKM® AK8817VQ digital-to-analog converter manufactured by AKM Semiconductor®. In some embodiments, FPGA 1206 may include DAC 1234. DAC 1234 converts a digital video stream produced by processor 1204 to an analog video stream for providing to central control 1218 via path 1222. FPGA 1206 receives the analog video stream from DAC 1234 at I/O cells 1232, and sends the analog video stream to central control 1218 via wires 1222. Central control 1218 sends the analog video stream via co-axial cable 1240 to display on a television monitor 1214. Central control 1218 may be part of standard CCTV network and television monitor 1214 may be a standard CCTV monitor.

Central control 1218 receives input from a PTZ controller 1216 via wires 1224. The input may include pan, tilt, or zoom requests. PTZ controller 1216 (via buttons 1238 and/or analog stick 1236) may be used to set the position, size, and other attributes of the video stream displayed on television monitor 1214. This feature is described further with reference to FIGS. 12A and 12B. PTZ controller 1216 may be a standard analog PTZ controller. Wires 1224 are twisted pair cables compatible with the RS-485 serial standard. In some embodiments, wires 1224 may be any standard twisted pair cables capable of carrying signals compatible with any serial standard, e.g., RS-232, RS-422, or RS-485. Central control 1218 passes along PTZ encoded command signals to FPGA 1206 via I/O cells 1226. FPGA 1206 receives the PTZ encoded command signals and decodes the signals to extract, e.g., Pelco® D PTZ commands, for processor 1204. Processor 1204 receives the PTZ commands and renders a new digital video stream based on the PTZ commands. Processor 1204 sends the new digital video stream for conversion to DAC 1234. The analog video stream is then displayed on television monitor 1214.

In some embodiments, television monitor 1214 and PTZ controller 1216 are connected directly to FPGA 1206, without central control 1218. For example, if only one digital security camera is in use, a central control may not be needed. The digital security camera may provide ports for direction connection with a television monitor and/or a PTZ controller.

In some embodiments, the digital security camera described herein may replace cameras in a conventional fixed camera system without a PTZ controller. The digital security camera described herein may be easily adapted to such a fixed camera system. The user may be provided with an application that runs on a personal computer. The personal computer is connected to the digital security camera via, e.g., Universal Serial Bus (USB) port 1242. The application may allow the user to choose views from the digital security camera that correspond to the views generated by the previously installed fixed cameras. The application may further allow the user to download image data from the digital security camera. The application may provide a user interface similar to the interface described below in reference to FIGS. 12A and 12B. Since the digital security camera described herein does not require that a PTZ controller be provided, the digital security camera may be easily deployed in analog CCTV networks having fixed cameras.

The video stream appearing on television monitor 1214 contains a composite of several videos presented simultaneously on the display. In addition to providing a video of the captured scene for situational awareness, the remaining videos provide enlarged views of particular sections of the captured scene. The result is a single security camera that generates multiple videos, each video being independently controllable for pan, tilt and zoom. The videos are generated by a single video camera operating on a common image memory and therefore are synchronized, as opposed to separate videos generated by separate cameras. The enlarged views in the composite video stream may be specified by a user using an interface on television monitor 1214. The user may input the selection via PTZ controller 1216, a keyboard, or any suitable input device. An illustrative example of a user interface for modifying the composite video stream is described below with reference to FIGS. 12A and 12B.

Figures 12A, 12B:
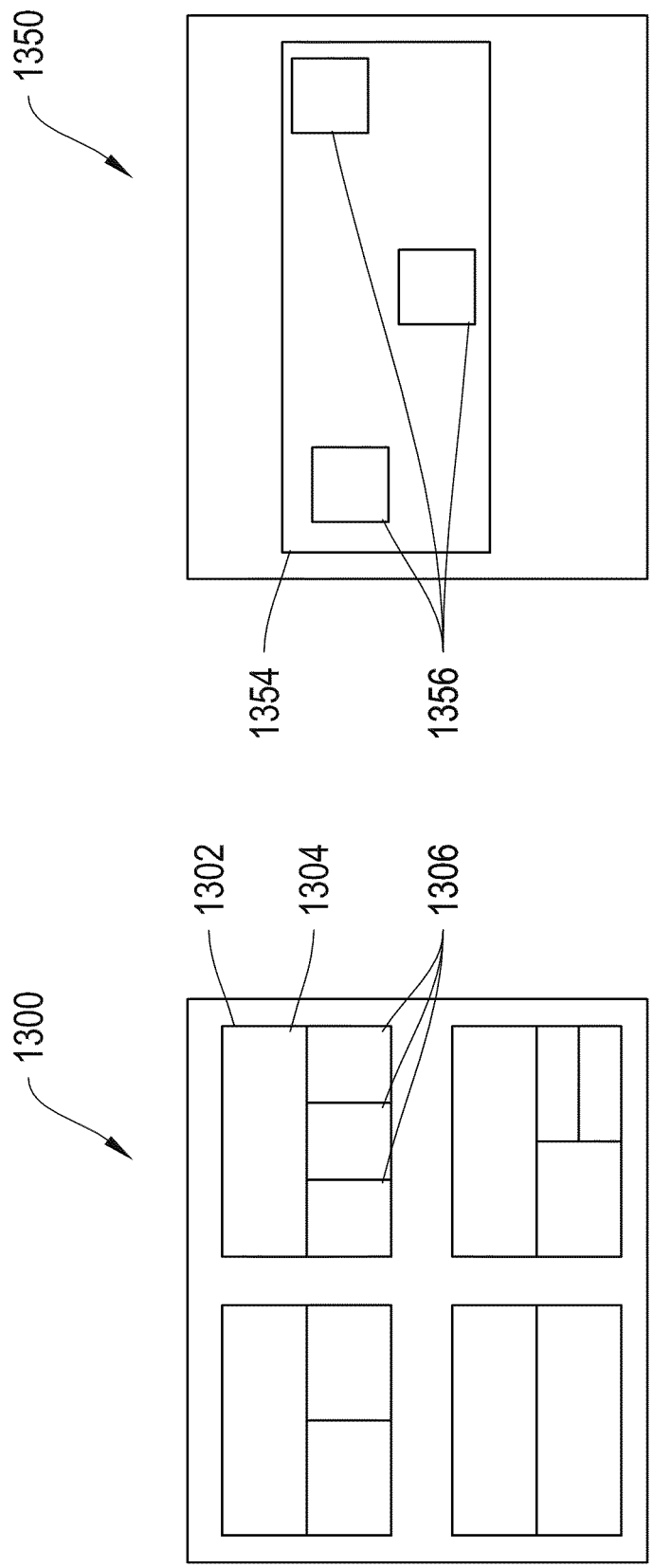
FIGS. 12A and 12B show a user interface for selecting the layout of a composite video stream, according to an illustrative embodiment.

FIGS. 12A and 12B show illustrative embodiments of a user interface for selecting the layout of the composite video stream displayed on television monitor 1214. FIG. 12A provides a user interface screen 1300 with examples of layouts a user can choose from. For example, layout 1302 provides a panoramic view 1304 for situational awareness, and enlarged views 1306 of particular sections of the captured scene. Multiple variations of layout 1302 are provided, but the layouts need not be limited to the variations shown. The user interface may be overlaid on the currently displayed content of television monitor 1214, and a user may use PTZ controller 1216 to select the desired layout. In some embodiments, the user may connect a personal computer via USB to the digital security camera, and run an application that provides the user interface and accepts input from the user.

In this example, the user selects layout 1302 and is then provided another user interface screen 1350, shown in FIG. 12B. The user is provided with panoramic view 1354 and zoom or magnification windows 1356 overlaid on panoramic view 1354. Panoramic view 1354 corresponds with panoramic view 1304. The user selects the desired zoom for magnified image portions or enlarged views 1306 of the panoramic view using zoom windows 1356. The user may drag the corners of any one of zoom windows 1356 using a window controller, e.g., a PTZ controller, to select the desired portion of the enlarged view. For example, the user may drag the corners using buttons 1234 and/or analog stick 1236 on PTZ controller 1216 to control placement of the zoom window. In some embodiments, television monitor 1214 may include a touch screen to allow the user to drag the zoom windows and/or their corners to specify the location of the enlarged view. While dragging the corners, the proportions of the zoom window continue to correspond with the proportions of the enlarged view. By dragging the corners, the user can specify the amount of zoom in each enlarged views 1306. By dragging the corners further away from each other, the user may decrease zoom and effectively increase resolution of the enlarged view. This magnification window process allows for processing an updated enlarged view, where the image size of the updated enlarged view may be larger relative to the previously specified enlarged view. Finally, the user can select which one of enlarged views 1306 is controlled by the PTZ controller during normal operation of the digital security camera. The user interface may further allow the user to select the format of the video stream, such as PAL or NTSC.

Figure 13:
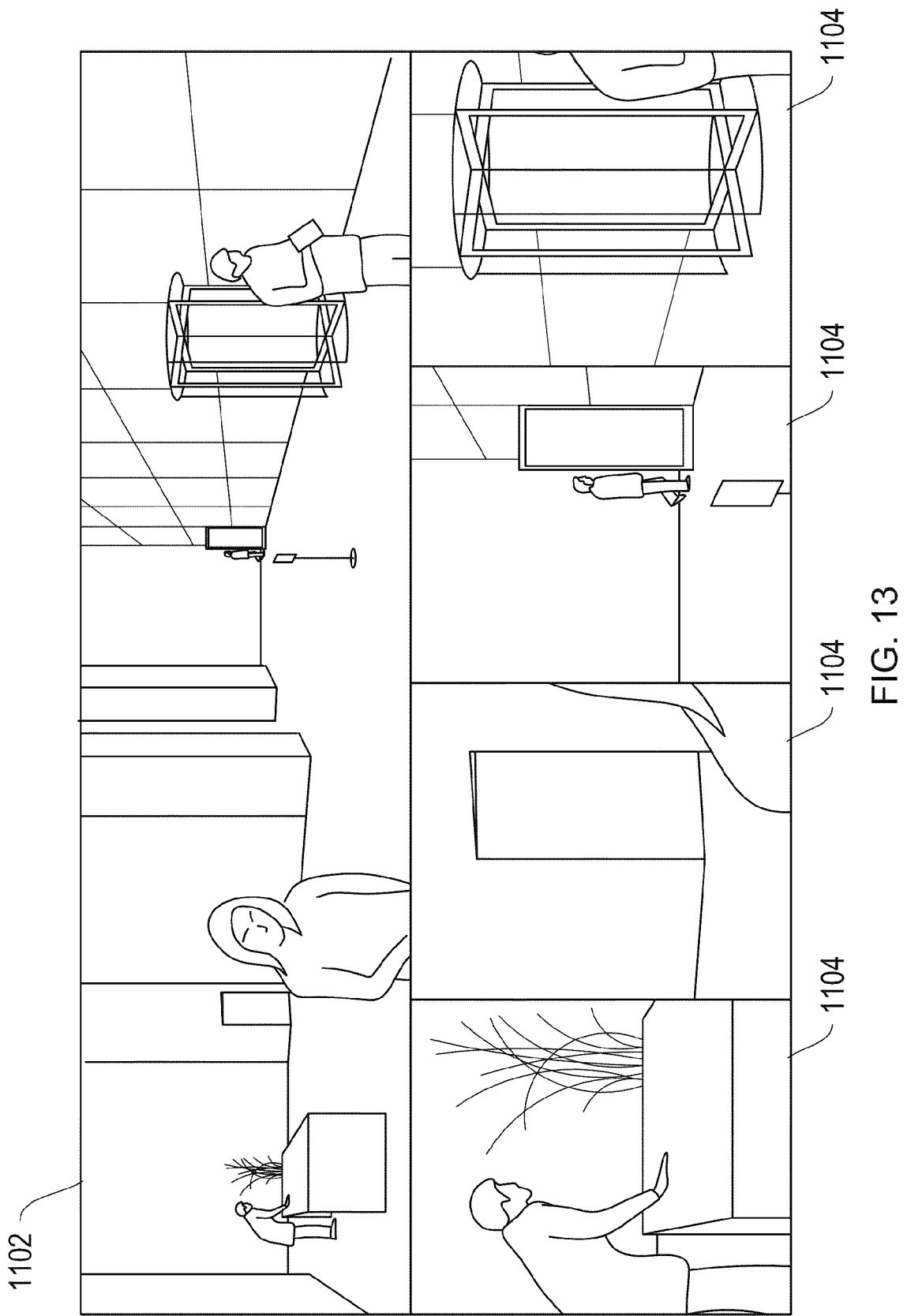
FIG. 13 depicts a composite image created by the camera shown in FIG. 10 or FIG. 11, according to an illustrative embodiment.

FIG. 13 shows a composite image generated by the system described in reference to FIG. 11 according to a layout specified via the user interface described in FIGS. 12A and 12B. The composite image includes a down sampled panoramic image 1102 that is given, e.g., half the image space of an NTSC format (640×480), so that it takes 640×240 pixels of resolution. The image may have been down sampled by, e.g., averaging sets of pixels in the image or by picking every Nth pixel in the image. FIG. 13 also shows four smaller images 1104, each taking up one-eight of the image space. Each of these images presents an enlarged view of a portion of the panoramic image. These enlarged images may be generated by reducing the extent of down sampling applied to those portions of the panoramic image. Each image 1104 is approximately one quarter of the width and half of the height of the layout screen. In the example of the NTSC format, each image of these images is 160×240 ((640/4)×(480/2)) and 38.4K pixels (160 pixel×240 pixel) per image. A 38.4K pixel sample may be sampled at full resolution, i.e., without down sampling, from the panoramic image. The area of the raw 38.4K pixel sample corresponds to less than 1% of the captured image data. Displaying this less than 1% of the image data within one-eight of the image space would yield a significantly magnified view of the captured area. As noted above when discussing the issue of situational awareness, such a magnified view may allow security personnel to view in greater detail certain sections of the scene, such as where a person's face may appear or where a license plate may exist.

In some embodiments, the digital security camera may be wirelessly connected and receive input wirelessly from a cell phone, a personal digital assistant (PDA), or suitable mobile device. The digital security camera may include a cell phone transceiver for sending a digital video stream to the cell phone. The cell phone transceiver may be compatible with one or more of GSM, CDMA, or any suitable type of cell phone network. FPGA 1206 may receive a request from a user cell phone to transmit a digital video stream of a scene being imaged. FPGA 1206 may initialize the camera elements, and receive images in a digital video stream. FPGA 1206 may convert the digital video stream into a format appropriate for viewing on a cell phone. For example, FPGA 1206 may down sample the images in the video stream to a resolution of 320×240, and further compress the video stream, to enable transmission over a low-bandwidth cell phone connection. FPGA 1206 may compress the video stream using a suitable compression format, e.g., videoconferencing format H.261, mobile phone video format H.263, or any other suitable compression format. FPGA 1206 may establish a cell phone connection with the user cell phone and transmit the video stream.

While viewing the video stream, the user cell phone may request a high-resolution image, e.g., 1 Mega pixel, of a current frame of the video stream. FPGA 1206 may extract the image from video memory and down sample the image, if necessary. For example, if the image already has a resolution of 1 Mega pixel, no down sampling is needed. FPGA 1206 transmits the high-resolution image to the user cell phone via the same cell phone connection for the video stream by interleaving portions of the image with the video stream. Such an approach may be suitable in instances where the cell phone connection is a low-bandwidth connection. Optionally, the user may request the high-resolution image be sent to an e-mail address or to another mobile device. FPGA 1206 may transmit the high-resolution image to the specified e-mail address or device via the same cell phone connection for the video stream by interleaving portions of the image with the video stream. However, in this case, only the video stream is transmitted to the user cell phone, while the high-resolution image is transmitted to the requested destination.

Variations, modifications, and other implementations of what is described may be employed without departing from the spirit and scope of the disclosure. More specifically, any of the method, system, and device features described above or incorporated by reference may be combined with any other suitable method, system, or device features disclosed herein or incorporated by reference, and is within the scope of the contemplated systems and methods described herein. The systems and methods may be embodied in other specific forms without departing from the spirit or essential characteristics thereof. The foregoing embodiments are therefore to be considered in all respects illustrative, rather than limiting of the systems and methods described herein. The teachings of all references cited herein are hereby incorporated by reference in their entirety.

The invention claimed is:

1. A system for imaging a scene, comprising
an optical head having a plurality of digital imaging sensors, wherein:
each digital imaging sensor of the plurality of digital imaging sensors generates image data,
the plurality of digital imaging sensors includes a first digital imaging sensor having a first field of view and a second digital imaging sensor having a second field of view, and
the plurality of digital imaging sensors is arranged such that the first field of view of the first digital imaging sensor at least partially overlaps the second field of view of the second digital imaging sensor;
a processor connected to the optical head and having circuitry for receiving image data from each digital imaging sensor in the plurality of digital imaging sensors, wherein the processor is configured for:
determining a first exposure value for the first imaging sensor and a second exposure value for the second imaging sensor,
determining, based on the first and second exposure values, a plurality of interpolated exposure values, wherein each interpolated exposure value of the plurality of interpolated exposure values corresponds to a column of photosensitive elements disposed between the center of the first imaging sensor and the center of the second imaging sensor,
modifying a first image corresponding to the first imaging sensor and a second image corresponding to the second imaging sensor based on the plurality of interpolated exposure values, and
generating an output digital image based on at least the modified first and second images; and
an analog communication port for converting the output digital image into an analog data stream suitable for delivery over an analog data path.

2. The system of claim 1, wherein
each digital imaging sensor of the plurality of digital imaging sensors has an image resolution greater than or equal to 0.075 Mega pixels.

3. The system of claim 1, wherein
each digital imaging sensor of the plurality of digital imaging sensors captures an image of a respective field of view, and
wherein the processor is further configured for combining a plurality of images to generate a combined image, wherein each image of the plurality of images corresponds to a digital imaging sensor of the plurality of digital imaging sensors and the combined image has a field of view greater than the respective field of view of at least one of the plurality of digital imaging sensors.

4. The system of claim 3, wherein the plurality of digital imaging sensors are arranged such that a combined field of view of the plurality of digital imaging sensors has an angular dimension of 160°-200°.

5. The system of claim 1, wherein the processor is further configured for selectively modifying a resolution of the output digital image.

6. The system of claim 5, wherein the processor is further configured for processing the output digital image to include a magnification window, wherein the magnification window is a portion of the output digital image having a higher resolution and a larger relative image size than at least one other portion of the output digital image.

7. The system of claim 6, further comprising a window controller for controlling at least one of the format and placement of the magnification window.

8. The system of claim 6, further including a user interface, and wherein the processor is further configured for modifying a location of the magnified image portion based on input from the user interface.

9. The system of claim 1, wherein the processor is further configured for performing motion tracking.

10. The system of claim 1, wherein the analog communication port includes a digital-to-analog (DAC) converter for generating a National Television System Committee (NTSC)- or Phase Alternating Line (PAL)-compliant television signal.

11. The system of claim 1, wherein the analog communication port includes a connector selected from a group comprising Video Graphics Array (VGA), Radio Corporation of America (RCA), 7-millimeter Amphenol Precision Connector (APC-7), Bayonet Neill-Concelman (BNC), Concelman (C), Ferrule (F), Neill (N), SubMiniature version A (SMA), Quick-connect SMA (QMA), SubMiniature version B (SMB), SubMiniature version C (SMC), Threaded Neill-Concelman (TNC), and Ultra High Frequency (UHF) connectors for coupling to the physical layer of a Closed-Circuit Television (CCTV) network.

12. The system of claim 1, wherein the analog communication port is further configured for receiving and decoding a Pan-Tilt-Zoom (PTZ) command signal, wherein the PTZ command signal is encoded for controlling the pan, tilt, and zoom of an analog security camera.

13. The system of claim 12, wherein the PTZ command signal is encoded in one of RS-232, RS-422, and RS-485 serial standards.

14. The system of claim 12, wherein the processor is further configured for generating the output digital image based on the PTZ command signal.

15. They system of claim 1, wherein the analog communication port is included in a Field-Programmable Gate Array (FPGA).

16. A method for imaging a scene, comprising
providing an optical head having a plurality of digital imaging sensors, wherein:
each digital imaging sensor of the plurality of digital imaging sensors generates image data; and
the plurality of digital imaging sensors is arranged such that a first imaging sensor having a first field of view is adjacent to a second imaging sensor having a second field of view, and the first field of view of the first imaging sensor at least partially overlaps the second field of view of the second imaging sensor;
receiving digital image data from each digital imaging sensor,
determining a first exposure value for the first imaging sensor and a second exposure value for the second imaging sensor,
determining, based on the first and second exposure values, a plurality of interpolated exposure values, wherein each interpolated exposure value of the plurality of interpolated exposure values corresponds to a column of photosensitive elements disposed between the center of the first imaging sensor and the center of the second imaging sensor,
modifying a first image corresponding to the first image sensor and a second image corresponding to the second imaging sensor based on the plurality of interpolated exposure values,
generating an output digital image based on at least the modified first and second images, and
converting the output digital image into an analog data stream suitable for delivery over an analog data path.

17. The method of claim 16, wherein each digital imaging sensor of the plurality of digital imaging sensors captures an image of a respective field of view, and further comprising:
combining a plurality of images to generate a combined image, wherein each image of the plurality of images corresponds to a digital imaging sensor of the plurality of digital imaging sensors and the combined image has a field of view greater than the respective field of view of at least one of the plurality of digital imaging sensors.

18. The method of claim 17, further comprising:
processing the combined image to include a magnification window, wherein the magnification window is a portion of the output digital image having a higher resolution and a larger relative image size than at least one other portion of the output digital image.

19. The method of claim 16, further comprising:
receiving and decoding Pan-Tilt-Zoom (PTZ) command signals encoded for controlling the pan, tilt, and zoom of an analog security camera.

20. The method of claim 16, wherein the analog data stream is an National Television System Committee (NTSC)- or Phase Alternating Line (PAL)-compliant television signal.

* * * * *